(12) United States Patent
Flake

(10) Patent No.: US 6,441,695 B1
(45) Date of Patent: Aug. 27, 2002

(54) METHODS FOR TRANSMITTING A WAVEFORM HAVING A CONTROLLABLE ATTENUATION AND PROPAGATION VELOCITY

(75) Inventor: Robert H. Flake, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 09/519,922

(22) Filed: Mar. 7, 2000

(51) Int. Cl.[7] .......................... H04B 3/04; G01R 27/02; G01R 31/02; G01R 31/08
(52) U.S. Cl. .......................... 333/20; 324/532; 324/600; 324/629; 324/710; 324/713; 324/160
(58) Field of Search .......................... 333/20; 324/600, 324/629, 649, 691, 710, 713, 532, 160, 178

(56) References Cited

U.S. PATENT DOCUMENTS

| | | | | |
|---|---|---|---|---|
| 3,668,415 A | * | 6/1972 | Marilleau | 333/20 X |
| 4,176,285 A | * | 11/1979 | Norris | 333/20 X |
| 4,559,602 A | * | 12/1985 | Bates, Jr. | 364/487 |
| 5,142,861 A | * | 9/1992 | Schlicher et al. | 60/203.1 |
| 5,319,311 A | * | 6/1994 | Kawashima et al. | 324/534 |
| 5,452,222 A | * | 9/1995 | Gray et al. | 364/481 |
| 5,650,728 A | * | 7/1997 | Rhein et al. | 324/543 |
| 5,686,872 A | * | 11/1997 | Fried et al. | 333/22 R |
| 5,857,001 A | * | 1/1999 | Preuss et al. | 375/257 |

* cited by examiner

*Primary Examiner*—Robert Pascal
*Assistant Examiner*—Barbara Summons
(74) *Attorney, Agent, or Firm*—Fulbright & Jaworski L.L.P.

(57) ABSTRACT

Methods for driving a lossy transmission media with an energy wave defined by a an exponential waveform function. The propagation delay and attenuation of the wave is a function of an exponential coefficient, and its propagation velocity is essentially constant and independent of displacement. Utilizing relationships between the propagation velocity, exponential coefficient, attenuation, and transmission line parameters, one may effectively model various transmission media. One may also determine unknown transmission line parameters, waveform exponential coefficients, attenuation, and/or propagation velocities by utilizing those relationships. By modulating the exponential coefficient, information may be encoded onto a waveform.

62 Claims, 13 Drawing Sheets

| EXPERIMENT | ALPHA | TOF(EXP) | TOF(HSPICE) | TOF(S.D.) |
|---|---|---|---|---|
| 63P | 105800 | 285.6/300.8 | 264.8 | 265.2 |
| 26P | 240000 | 214.7/214.1 | 213.8 | 214.5 |
| 08P | 805000 | 180.0/182.9 | 178.4 | 178.1 |
| 02P | 2700000 | 167.0/167.0 | 164.6 | 164.1 |
| 005L | 11700000 | 158.4/158.4 | 157.3 | 157.7 |

100 FT COAX CABLE TIME OF FLIGHT DATA IN NANOSECONDS

FIG. 10

METHODS FOR TRANSMITTING A WAVEFORM HAVING A CONTROLLABLE ATTENUATION AND PROPAGATION VELOCITY

BACKGROUND OF THE INVENTION

Transmission lines, with their characteristic loss of signal as well as inherent time delay, may create problems in designing systems that employ a plurality of signals that may undergo delay and distortion. Modern computers, for example, are systems that employ a plurality of electrical signals and for which transmission line properties, such as delay, must be considered. Both digital computer chips and the circuit boards for interconnecting the signals of these computer chips may have transmission line effects.

Typical signals when used to generate inputs to transmission lines generally exhibit delay or propagation times that are not easily determinable. The propagation velocity of these waves is also variable with displacement along the transmission line.

Changing or modifying the delay of an electromagnetic transmission line usually involves changing the physical length of the line; changing the width, thickness and spacing of the line; modifying the capacitance of the line at points spaced along the line; or altering the transmission line by changing the dielectric constant of the media surrounding the line's conductor. None of these methods, however, lend themselves to applications where it may be desirable to vary, change, or otherwise modify the propagation time of a pulse applied to a lossy transmission line.

Current transmission line technology is based on the theory of lossless transmission and assumes that pulse propagation speed along a transmission line is constant. This assumption, however, significantly restricts design options for implementing delay lines in electronic circuits. Specifically, delay lines are currently implemented by increasing the signal path (so the signal takes longer to arrive at a destination) or by adding additional active circuitry to slow down a signal. In either case, changing the amount of delay may be difficult and/or expensive because it may require redesigning and changing circuitry. Moreover, there is often no way to controllably vary delay based on different input conditions. Therefore, it would be advantageous to have the ability to implement a delay line that could controllably vary a delay time or attenuation based on different input conditions and that could be implemented simply and inexpensively.

Currently known methods for measuring transmission line parameters, such as resistance, inductance, capacitance, and conductance, typically require specialized instrumentation that may be very expensive. Therefore, it would be advantageous to have the ability to measure such parameters in a simple manner using, for instance, inexpensive multi-purpose instrumentation generally available in electronics laboratories such as an oscilloscope or a signal wave-form generator.

The amount of delay in networks, including broad band networks, is often a primary design factor. Current design techniques for analyzing the length of delay in non-inductive and inductive transmission line networks, however, are notoriously inaccurate; therefore, it would be advantageous to have the ability to employ a simple formula to calculate the total delay or attenuation in non-inductive as well as inductive networks with a high degree of accuracy. It would be further advantageous if such a method could be utilized in computer-aided-design (CAD) systems.

SUMMARY OF THE INVENTION

In one respect, the invention is a method for transmitting a waveform having an essentially constant propagation velocity along a transmission line. As used herein, "waveform" shall be read broadly to mean any energy signal, or representation thereof. As used herein, "transmission line" shall be read broadly to refer to any media capable of transmitting a particular waveform. Transmission line may refer to a broad range of media including, but not limited to, electrically conducting and mechanically vibrating media. According to the method, an exponential waveform is generated. The exponential waveform is characterized by an exponential coefficient $\alpha$. The waveform is applied to the transmission line to transmit the waveform at an essentially constant propagation velocity, and the propagation velocity is related to $\alpha$ and a transmission parameter of the transmission line. As used herein, "transmission parameter" shall be read broadly to refer to any discernable characteristic of the media making up the transmission line.

In other respects, the transmission parameter may include inductance, resistance, capacitance, conductance, or any combination thereof of the transmission line. The propagation velocity may be related to a in accordance with several different equations such as, but not limited to, those described herein. An attenuation coefficient of the waveform may also be related to cc in accordance with several different equations such as, but not limited to, those described herein. The transmission line may include an electrical conductor. The transmission line may include a conducting trace. The transmission line may include a delay line. The transmission line may include an interconnect. The transmission line may include an acoustic medium. The transmission line may include a diffusion medium. The method may also include varying a in response to an input signal to the waveform generator. The method may also include determining the propagation velocity and calculating the transmission parameter using the propagation velocity and the exponential coefficient. Determining the propagation velocity may include receiving propagation information from the transmission line using one or more receiving elements coupled to the transmission line. The one or more receiving elements may include a threshold detector. The method may also include determining an impedance discontinuity of the transmission line and its location using the exponential coefficient, the propagation velocity, and the transmission parameter. The method may also include varying the exponential coefficient $\alpha$ to encode information onto the waveform. The method may also include monitoring modulated propagation velocity to decode the information. The method may also include monitoring modulated attenuation to decode the information.

In another respect, the invention is a method for transmitting a waveform along a transmission line. An exponential waveform is generated. The exponential waveform is characterized by an exponential coefficient $\alpha$. The waveform is applied to the transmission line to transmit the waveform such that an attenuation constant of the waveform is related to $\alpha$ and a transmission parameter of the transmission line.

In other respects, the method may also include determining an impedance discontinuity of the transmission line and its location using the exponential coefficient; the attenuation constant, and the transmission parameter.

In another respect, the invention is a method for calculating an unknown waveform transmission characteristic from two known waveform transmission characteristics. An exponential waveform is constructed that is capable of being transmitted along a transmission line with an essentially constant propagation velocity. The propagation velocity is related to a transmission parameter of the transmission line and to an exponential coefficient of the waveform. The transmission parameter defines a first unknown waveform transmission characteristic, the propagation velocity defines a second unknown waveform transmission characteristic, and the exponential coefficient defines a third unknown waveform transmission characteristic. One of the three unknown waveform transmission characteristics is calculated by setting the remaining two of the three unknown waveform transmission characteristics equal to two known waveform transmission characteristics.

In other respects, the method may also include generating the exponential waveform and transmitting the waveform along the transmission line. The transmission line may include a model transmission line. The remaining two of the three unknown waveform transmission characteristics may be set equal to two known waveform transmission characteristics by measurement. One of the two known waveform transmission characteristics may include the transmission parameter and the other of the two known waveform transmission characteristics may include the propagation velocity. The propagation velocity may correspond to a desired delay time for the transmission line, and the exponential coefficient may be calculated to yield a computed exponential coefficient. The method may also include inputting an exponential waveform with the computed exponential coefficient onto the transmission line to achieve the desired delay time. The transmission line may include a model transmission line, and the method may further include fabricating an actual transmission line to correspond to the model transmission line. The actual transmission line may be configured to transmit an exponential waveform having the computed exponential coefficient to achieve the desired delay time. The model transmission line may include a computer aided design model. One of the two known waveform transmission characteristics may include the exponential coefficient, and the other of the two known waveform transmission characteristics may include the propagation velocity. The propagation velocity may be measured with an exponential waveform having the exponential coefficient, and the transmission parameter may be calculated. The transmission parameter may include inductance, resistance, capacitance, conductance, or any combination thereof of the transmission line.

In another respect, the invention is a method for calculating an unknown waveform transmission characteristic from two known waveform transmission characteristics. An exponential waveform is constructed that is capable of being transmitted along a transmission line with an attenuation constant related to a transmission parameter of the transmission line and to an exponential coefficient of the waveform. The transmission parameter defines a first unknown waveform transmission characteristic, the attenuation constant defines a second unknown waveform transmission characteristic, and the exponential coefficient defines a third unknown waveform transmission characteristic. One of the three unknown waveform transmission characteristics is calculated by setting the remaining two of the three unknown waveform transmission characteristics equal to two known waveform transmission characteristics.

In other respects, one of the two known waveform transmission characteristics may include the transmission parameter and the other of the two known waveform transmission characteristics may include the attenuation constant. The attenuation. constant may correspond to a desired attenuation for the transmission line, and the exponential coefficient may be calculated to yield a computed exponential coefficient. The method may also include inputting an exponential waveform with the computed exponential coefficient onto the transmission line to achieve the desired attenuation.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 10 is a table of experimental results of driving a 100-foot coax transmission line with a positive exponential with a variable exponential coefficient alpha ($\alpha$) according to the present disclosure.

DESCRIPTION OF ILLUSTRATIVE EMBODIMENTS

Figure 1A:
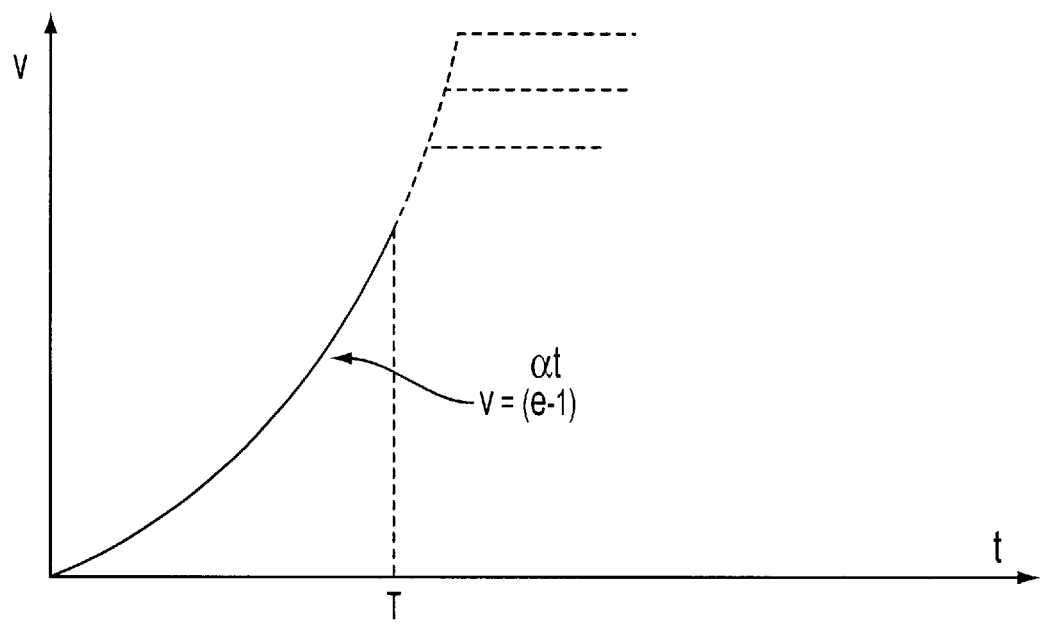
FIGS. 1A and 1B. are graphs showing positive exponential waveforms over a time interval T.

The presently disclosed methods and systems involve the ability to vary the propagation speed and attenuation of one or more signal pulses in transmission lines. According to the methodology described herein, the propagation speed and attenuation of a pulse in a lossy transmission line depends on the shape of the signal applied to the line. The propagation velocity and attenuation may be controlled by controlling the shape of the signal. In particular, it has been found that if an exponential signal is applied to a lossy transmission line, the resulting propagation velocity and attenuation will depend on an exponential coefficient (the coefficient being positive or negative) of that signal. With a constant exponential coefficient, the propagation velocity is essentially constant. Changing the value of the exponential coefficient creates a controllably variable signal propagation speed and attenuation.

With the benefit of this disclosure, an adjustable delay line (and an adjustable attenuation line) may be implemented by using one or more exponential pulse signals as input pulses in a transmission line circuit. The amount of delay may be controllably varied, without modifying signal paths, by changing the shape of the input pulse signal. More specifically, delay may be varied by varying an exponential coefficient of an exponential waveform. Having the ability to control delay time provides for an improved method for reducing timing skews in many different types of circuits.

It has also been found that the propagation velocity and attenuation of an exponential waveform depends not only on its exponential coefficient, but also upon different transmission parameters of the transmission line. For instance, it has been found that resistance, inductance, capacitance, and conductance of a transmission line relate to propagation velocity and an exponential coefficient of an exponential waveform. Because the velocity and attenuation of an exponential pulse waveform depends on the signal shape as well as transmission line parameters, line parameters may be determined by measuring the response of a line to exponential signals of different shapes. Characteristic transmission line parameters may be evaluated by measuring propagation velocity or signal attenuation using a known exponential coefficient to solve for an unknown line parameter. Alternatively, propagation velocity or signal attenuation may be evaluated by using a known exponential coefficient and known transmission line parameters. Alternatively, an exponential coefficient may be evaluated by measuring a propagation velocity or signal attenuation on a line having known transmission line parameters.

To extract parameters of a lossy transmission line, a transmission line segment of length L under test may be driven with an input voltage containing a function such as $De^{\alpha t}$ alternatively using two different values of the exponential coefficient $\alpha$. At each $\alpha$, a measurement of the propagation time $t_{of}$ (where "of" signifies "of-flight") may be made, and propagation velocities may be calculated using, $v=t_{of}/L$. Simultaneous equations (exemplary equations are discussed in more detail below) including one or more line parameters along with $\alpha$ and velocity v may then be used along with measured values of $\alpha$ and v to determine one or more line parameters.

With the benefit of the present disclosure, current integrated circuit interconnect modeling techniques may be improved because simple formulae may be employed to calculate the total delay or signal attenuation in non-inductive as well as inductive transmission networks with a high degree of accuracy. Knowing the relationship between an input exponential coefficient of a waveform, propagation velocity or signal attenuation, and one or more transmission line parameters, one may accurately model time delays or signal attenuation within a circuit or a set of coupled transmission line circuits. Further, by knowing transmission line parameters, one may compute a desired exponential coefficient that, when applied to a transmission line, will produce a desired delay time or a desired signal attenuation. With the benefit of the present disclosure, one skilled in the art will understand that these results may be applied to coupled circuits including coupled transmission lines.

With the benefit of the present disclosure, other applications utilizing an exponential waveform include, but are not limited to, controllably varying a propagation speed and attenuation of an electromagnetic plane and/or spherical wave in electrical lossy media; controllably varying a propagation speed and attenuation of sound waves in a lossy acoustic media such as viscous and relaxing gases, fluids, and solids; and the implementation of signal modulation in lossy communication links wherein information is conveyed by monitoring a controlled variation in propagation speed and/or signal attenuation.

The operation of the present disclosure may be better understood with reference to equations that describe the propagation of a signal along various media. The behavior of certain transmission lines may be described by the telegrapher's equation. Various versions of the telegrapher's equation, with an input exponential waveform in accordance with the present disclosure, are enumerated below. Throughout this disclosure, solutions to various equations are designated as "SD" solutions. By "SD," or "sd," it is meant "Speedy Delivery," which is a term coined by the inventor to describe solutions that provide the advantageous properties disclosed herein. Specifically, the SD solutions are waveforms that may be transmitted at a velocity and with an attenuation related to an exponential coefficient and one or more line parameters.

The exponential coefficient giving rise to SD solutions may be positive or negative, and the waveforms may travel in the positive or negative direction. For convenience, in the examples below, the exponential coefficient is assumed to be positive and the waveforms travel in the positive direction. In terms of electrical transmission lines, the four parameters appearing in the telegrapher's equation are $\overline{R}$— resistance per unit length, $\overline{L}$— inductance per unit length, $\overline{C}$— capacitance per unit length, and $\overline{G}$—conductance per unit length.

The first version of the telegrapher's equation considered has non-vanishing values for $\overline{R}$ and $\overline{C}$.

1. $\overline{RC}$ Line

The telegrapher's equation in this case is $$\overline{RC}\frac{\partial V}{\partial t} = \frac{\partial^2 V}{\partial x^2}$$

The SD solution is $$V(x, t) = De^{[\alpha t - x\sqrt{\overline{RC}\alpha}]},$$

where $V(0, t)=De^{\alpha t}$ is the SD boundary condition.

The propagation velocity of this wave is $$v = \sqrt{\frac{\alpha}{\overline{RC}}}$$

or the propagation delay of the wave per unit distance is $$\tau\left(=\frac{1}{v}\right) = \sqrt{RC\tau_{sd}},$$

where $\tau_{sd} \equiv 1/\alpha$. Thus, the propagation velocity v and the delay per unit distance depend on the parameter $$\left(\text{or } \frac{1}{\tau_{sd}}\right).$$

The attenuation of this propagating wave is described by $$\frac{v(x,t)}{v(0,t)} = e^{-x\sqrt{RC\alpha}}.$$

Thus, the coefficient of attenuation $$\left(\sqrt{RC\alpha}\right)$$

is also dependent on $$\left(\text{or } \frac{1}{\tau_{sd}}\right).$$

The current in a transmission line satisfies the same partial differential equation as the voltage. The SD current waveforms have the same form as the voltage and thus the SD current pulse has the same controllable propagating velocity and attenuation properties as the voltage.

2. Diffusion

The previous example of the telegrapher's equation has the same form as the diffusion equation which describes many physical phenomena such as thermal conduction and other forms of transport of matter resulting from random molecular motions as is known in the art. The SD results for thermal conduction in the x-direction in an isotropic solid may be illustrated as follows:

$$\frac{1}{\kappa}\frac{\partial T}{\partial t} = \frac{\partial^2 T}{\partial x^2},$$

where $T(x,t)$ is the temperature in the solid at point x and time t. The coefficient k is the diffusivity.

The SD solution is $$T(x,t) = De^{[\alpha t - x\sqrt{\alpha/k}]}$$

The propagation velocity of this thermal wave is $v = \sqrt{\alpha k}$ with coefficient of attenuation equal $\sqrt{\alpha/k}$.

3. $\overline{RLC}$ Line

The telegrapher's equation in this case is $$\overline{LC}\frac{\partial^2 V}{\partial t^2} + \overline{RC}\frac{\partial V}{\partial t} = \frac{\partial^2 V}{\partial x^2}$$

and the SD solution includes:

$$V(x,t) = De^{[\alpha t - x\sqrt{\overline{LC}\alpha^2 + \overline{RC}\alpha}]}$$

The propagation velocity of this wave is $$v = \frac{1}{\sqrt{(\overline{LC}) + (\overline{RC})\left(\frac{1}{\alpha}\right)}} = \frac{1}{\sqrt{\overline{LC}}\sqrt{1 + \left(\frac{\overline{R}}{\overline{L}}\right)\left(\frac{1}{\alpha}\right)}}$$

or, the propagation delay per unit distance is $$\tau = \sqrt{(\overline{LC}) + (\overline{RC})\left(\frac{1}{\alpha}\right)} = \sqrt{\overline{LC}}\sqrt{1 + \left(\frac{\overline{R}}{\overline{L}}\right)\frac{1}{\alpha}}, \text{ or,}$$

$$\tau = \sqrt{\overline{LC}}\sqrt{1 + (\overline{R}/\overline{L})\tau_{sd}} \text{ where } \tau_{sd} = 1/\alpha.$$

Again, v (or $\tau$) depends on $\alpha$ (or $\tau_{sd}$). The attenuation is described by $$\frac{V(x,t)}{V(0,t)} = e^{-x\sqrt{\overline{LC}\alpha^2 + \overline{RC}\alpha}}$$

and the coefficient of attenuation is $$\sqrt{\overline{LC}\alpha^2 + \overline{RC}\alpha},$$

which is also dependent on $\alpha$.

4. $\overline{CLG}$ Line

Another version of the telegrapher's equation has non-vanishing values for $\overline{G}$, $\overline{L}$, and $\overline{C}$:

$$\overline{LC}\frac{\partial^2 V}{\partial t^2} + \overline{LG}\frac{\partial V}{\partial t} = \frac{\partial^2 V}{\partial x^2}$$

This has the same form as the previous ($\overline{RLC}$) case with propagation velocity, delay per unit distance, and attenuation expressions obtained by substituting $\overline{LG}$ for $\overline{RC}$ in the previous results.

$$v = \frac{1}{\sqrt{(\overline{LC}) + (\overline{LG})\left(\frac{1}{\alpha}\right)}} \text{ or,}$$

$$\tau = \sqrt{\overline{LC}}\sqrt{1 + \left(\frac{\overline{G}}{\overline{C}}\right)\left(\frac{1}{\alpha}\right)} = \sqrt{\overline{LC}}\sqrt{1 + (\overline{G}/\overline{C})\tau_{sd}}$$

and attenuation coefficient $$\sqrt{\overline{LC}\alpha^2 + \overline{LG}\alpha}.$$

5. Electromagnetic Plane Wave Propagation in a Lossy Media

The propagation of an electromagnetic plane wave in the x-direction and having field components $E_y$ and $H_z$ may be described by the two equations:

$$\mu\varepsilon\frac{\partial^2 E_y(x,t)}{\partial t^2} + \mu\sigma\frac{\partial E_y(x,t)}{\partial t} = \frac{\partial^2 E_y(x,t)}{\partial x^2}$$

and the same form for $H_z$ $$\mu\epsilon\frac{\partial^2 H_z(x,t)}{\partial t^2} + \mu\sigma\frac{\partial H_z(x,t)}{\partial t} = \frac{\partial^2 H_z(x,t)}{\partial x^2}$$

where $\mu$ represents the electrical permeability of the media, $\epsilon$ represents the electrical permittivity of the media, and C represents the electrical conductivity of the media.

A comparison of these equations with the telegrapher's equation of the same form having non-vanishing values for the $\overline{C}$, $\overline{L}$, and $\overline{G}$ parameters indicate an analogous set of relations:

| $\overline{CLG}$ Transmission Line | EM Plane Wave in Lossy Media |
|---|---|
| V (Volt) | B (Volt/m) |
| I (Ampere) | H (Ampere/m) |
| $\overline{C}$ (Farad/m) | $\epsilon$ (Farad/m) |
| $\overline{L}$ (Henry/m) | $\mu$ (Henry/m) |
| $\overline{G}$ (Mho/m) | $\sigma$ (Mho/m) | and, the velocity of propagation of the SD solutions for $E_y$ and $H_z$ is $$v = \frac{1}{\sqrt{(\mu\epsilon)+(\mu\sigma)\left(\frac{1}{\alpha}\right)}}$$

with attenuation coefficient $\sqrt{(\mu\epsilon)\alpha^2+(\mu\sigma)\alpha}$.

Another version with only $\overline{L}$ and $\overline{G}$ non-zero is analogous to the $\overline{RC}$ case with $\overline{LG}$ replacing $\overline{RC}$ in the expressions for the velocity, time delay, and attenuation of the propagating wave.

The results for all four parameters having non-vanishing values follow. The telegrapher's equation in this case is $$\overline{LC}\frac{\partial^2 V}{\partial t^2} + (\overline{LG}+\overline{RC})\frac{\partial V}{\partial t} + \overline{RG}V = \frac{\partial^2 V}{\partial x^2}$$

and the SD wave solution includes $$V(x,t) = De^{[\alpha t - x\sqrt{\overline{LC}\alpha^2+(\overline{LG}+\overline{RC})\alpha+\overline{RG}}]}$$

The propagation velocity of this wave is $$v = \frac{1}{\sqrt{\overline{LC}+(\overline{LG}+\overline{RC})\left(\frac{1}{\alpha}\right)+\overline{RG}\left(\frac{1}{\alpha}\right)^2}}$$

and the delay per unit distance is $$\tau = \sqrt{\overline{LC}}\sqrt{1+\left(\frac{\overline{R}}{\overline{L}}+\frac{\overline{G}}{\overline{C}}\right)\left(\frac{1}{\alpha}\right)+\left(\frac{\overline{RG}}{\overline{LC}}\right)\left(\frac{1}{\alpha^2}\right)} \quad \text{or}$$

$$\tau = \sqrt{\overline{LC}}\sqrt{1+\left(\frac{\overline{R}}{\overline{L}}+\frac{\overline{G}}{\overline{C}}\right)\tau_{sd}+\left(\frac{\overline{RG}}{\overline{LC}}\right)\tau_{sd}^2} \quad \left(\text{again, } \tau_{sd} \equiv \frac{1}{\alpha}\right)$$

and the attenuation of this wave is $$\frac{V(x,t)}{V(0,t)} = e^{-x\sqrt{\overline{LC}\alpha^2+(\overline{LG}+\overline{RC})\alpha+\overline{RG}}}$$

Thus, the coefficient of attenuation is $$\sqrt{\overline{LC}\alpha^2+(\overline{LG}+\overline{RC})\alpha+\overline{RG}}.$$

Again, the propagating velocity, delay per unit distance, and attenuation of the wave depend on $\alpha$ (or $\tau_{sd}$).

6. Complex Frequency Dependent Parameters

The transmission line parameters are frequency dependent in some applications.

Some examples are when $\overline{R}=\overline{R}(s)$ because of skin depth effects, $\overline{L}=\overline{L}(s)$ because current return paths are frequency dependent, and $\overline{G}=\overline{G}(s)$ resulting from frequency dependent dielectric losses. As used herein, "s" refers to a complex variable.

The SD solution of the four-parameter telegrapher's equation with frequency dependent effects in the four parameters $$V(x,t) = De^{[\alpha t - x\sqrt{(\overline{L}(\alpha)\overline{C}(\alpha))\alpha^2+(\overline{L}(\alpha)\overline{G}(\alpha)+\overline{R}(\alpha)\overline{C}(\alpha))\alpha+\overline{R}(\alpha)\overline{G}(\alpha)}]}$$

and the propagation velocity of this wave is $$v = \frac{1}{\sqrt{(\overline{L}(\alpha)\overline{C}(\alpha))+(\overline{L}(\alpha)\overline{G}(\alpha)+\overline{R}(\alpha)\overline{C}(\alpha))\left(\frac{1}{\alpha}\right)+\overline{R}(\alpha)\overline{G}(\alpha)\left(\frac{1}{\alpha}\right)^2}}$$

with attenuation $$\frac{V(x,t)}{V(0,t)} = e^{-x\sqrt{(\overline{L}(\alpha)\overline{C}(\alpha))\alpha^2+(\overline{L}(\alpha)\overline{G}(\alpha)+\overline{R}(\alpha)\overline{C}(\alpha))\alpha+\overline{R}(\alpha)\overline{G}(\alpha)}}$$

The coefficient of attenuation is $$\sqrt{(\overline{L}(\alpha)\overline{C}(\alpha))\alpha^2+(\overline{L}(\alpha)\overline{G}(\alpha)+\overline{R}(\alpha)\overline{C}(\alpha))\alpha+\overline{R}(\alpha)\overline{G}(\alpha)}.$$

7. Spherical Waves in 3-Dimensions

The various versions of the telegrapher's equation may be generalized to 3-space, replacing $$\frac{\partial^2}{\partial x^2}$$

with the Laplacian operator $\nabla^2$. We will illustrate the generalization to 3-space using the example of electromagnetic wave propagation. If the electromagnetic waves are outgoing spherical vector waves, i.e. if the solutions $E_\theta = E_\theta(r,t)$ and $H_{100} = H_{100}(r,t)$ are functions of radial distance (r) and of time (t) but not of the angular coordinates $\theta$ and $\phi$, then the SD solutions described before, modified by being divided by the radial distance, r, satisfy the 3-dimension propagation equations formed when all the various versions of the telegrapher's equation have $\frac{\partial^2}{\partial x^2}$ replaced by $\nabla^2 = \frac{1}{r}\frac{\partial^2 (r)}{\partial r^2}$.

Thus, $rE_\theta(r,t)$ and $rH_\phi(r,t)$ satisfy the same telegrapher's equations as before, with x replaced by r. The propagation velocities of the spherical vector waves along the radial direction are the same as obtained before for propagation along the x-axis. The waveform attenuation has the influence of the additional $1/r$ factor included as well as the same previous $\alpha$ dependence in the decaying exponential coefficient. Consider the spherically symmetric, 3-dimensional version of the electromagnetic wave equation for $E_\theta$.

$$\mu\varepsilon\frac{\partial^2 E_\theta(r,t)}{\partial t^2} + \mu\sigma\frac{\partial E_\theta(r,t)}{\partial t} = \frac{1}{r}\frac{\partial^2 (rE_\theta(r,t))}{\partial r^2}$$

Since r is a constant, $$\frac{\partial^2 E_\theta(r,t)}{\partial t^2} = \frac{1}{r}\frac{\partial^2 (rE_\theta(r,t))}{\partial t^2}, \text{ and } \frac{\partial E_\theta(r,t)}{\partial t} = \frac{1}{r}\frac{\partial (rE_\theta(r,t))}{\partial t} \text{ so,}$$

$$\mu\varepsilon\frac{1}{r}\frac{\partial^2 (rE_\theta(r,t))}{\partial t^2} + \mu\sigma\frac{1}{r}\frac{\partial (rE_\theta(r,t))}{\partial t} = \frac{1}{r}\frac{\partial^2 (rE_\theta(r,t))}{\partial r^2},$$

and canceling the $1/r$ terms yield the same telegrapher's equation form as before. Thus, the SD solution is $$rE_\theta(r,t) = De^{\left[\alpha t - r\sqrt{\mu\varepsilon\alpha^2 + \mu\sigma\alpha}\right]} \text{ or}$$

$$E_\theta(r,t) = \frac{De^{\left[\alpha t - r\sqrt{\mu\varepsilon\alpha^2 + \mu\sigma\alpha}\right]}}{r}$$

and propagation velocity in 3-space along the radial direction is $$v_r = \frac{1}{\sqrt{(\mu\varepsilon) + (\mu\sigma)\left(\frac{1}{\alpha}\right)}}$$

which is the same form obtained before for the velocity of propagation in the one-dimensional case along the x-axis. The magnitude of $E_\theta(r,t)$ (and $H_\theta(r,t)$) diminishes as $1/r$, $$\frac{E_\theta(r,t)}{E_\theta(r_1,t)} = \left(\frac{r_1}{r}\right)e^{-(r-r_1)\sqrt{\mu\varepsilon\alpha^2 + \mu\sigma\alpha}}$$

and the exponential decay coefficient is $\sqrt{\mu\varepsilon\alpha^2 + \mu\sigma\alpha}$.

8. Results for Other Forms of Lossy Wave Equations

The SD results extend to other forms of lossy wave equations that do not conform to a version of. the telegrapher's equation. One such case is acoustical plane waves traveling in a viscous absorption media. In this case the lossy wave equation is $$\frac{\partial^2 \xi}{\partial t^2} = c^2\frac{\partial^2 \xi}{\partial x^2} + \frac{R}{\rho_0}\frac{\partial^3 \xi}{\partial x^2 \partial t}$$

where $\xi$=particle displacement form equilibrium position, along x-axis
   c=velocity of propagation of the wave in the media without viscosity
   R=effective viscosity
   $\rho_0$=constant equilibrium density of the medium The SD wave solution of this equation is $$\xi(x,t) = De^{\left[\alpha t - \frac{\alpha x}{\sqrt{c^2 + \left(\frac{R}{\rho_0}\right)\alpha}}\right]}$$

and the propagation velocity is $$v = \sqrt{c^2 + (R/\rho_0)\alpha}$$

with waveform attenuation $$\frac{\xi(x,t)}{\xi(0,t)} = e^{\frac{-\alpha x}{\sqrt{c^2 + \left(\frac{R}{\rho_0}\right)\alpha}}}.$$

Frequency dependent parameters are accommodated in the SD propagation velocity and attenuation results here in the same fashion as they were in the Telegrapher's Equation. That is, if $c=c(s)$, then the expressions for v and attenuation above are modified simply by replacing $c^2$ with $c^2(\alpha)$.

A second acoustical wave example is the propagation of sound in a chemically reacting fluid composed, of two or more constituents (such as sea water). The example below is for a fluid with two constituents:

$$\tau(P_{tt} - c^2_\infty P_{xx})_t + (P_{tt} - c^2_0 P_{xx}) = 0$$

where $c_\infty$ and $c_0$ are the sound speeds at infinite frequency and zero frequency. $\tau$ is the relaxation time associated with the chemical reaction of the two constituents, and P is the sound wave pressure. The SD propagation velocity of this sound wave is $$v = \sqrt{\frac{\tau c^2_\infty \alpha + c^2_0}{\tau\alpha + 1}}$$

with attenuation $$\frac{P(x,t)}{P(0,t)} = e^{-\alpha x\sqrt{\frac{\tau\alpha + 1}{\tau c^2_\infty \alpha + c^2_0}}}$$

The previous discussion of methods for using SD waveforms for controlling the speed of propagation and attenuation of acoustic waves can be applied to extract information characterizing viscous acoustical absorbing media and chemically reacting acoustical media. Specifically, by measuring propagation velocity with a known exponential coefficient, one may determine one or more acoustic parameters.

Another example of lossy propagation in a thermal problem that does not conform to a version of the telegrapher's equation is a partial differential-integral equation describing the temperature transient resulting from heat conduction along a microstrip line or a highly conducting rod buried in a lower conductivity substrate:

$$\frac{\partial^2 T(x,t)}{\partial x^2} = \frac{1}{\kappa}\frac{\partial T(x,t)}{\partial t} + \frac{1}{KA}\int_0^t T(x,t)g(t-\tau)d\tau$$

where $T(x,t)$ is the temperature along the line (or rod), $\kappa$ is the thermal diffusivity, K is the thermal conductivity and A is the cross sectional area of the line (rod). g(t) represents the approximate Green's function of the thermal conduction from the heated line (rod) into the substrate, omitting spatial dependence.

The SD wave solution of this equation is (G(s) is the Laplace transform of g(t))

$$T(x,t) = De^{\left(\alpha t - x\sqrt{\frac{\alpha}{\kappa} + \frac{G(\alpha)}{KA}}\right)}$$

with propagation velocity $$v = \frac{\alpha}{\sqrt{\frac{\alpha}{\kappa} + \frac{G(\alpha)}{KA}}}$$

and the waveform attenuation is $$\frac{T(x,t)}{T(0,t)} = e^{-x\sqrt{\frac{\alpha}{\kappa} + \frac{G(\alpha)}{KA}}}$$

In an embodiment utilizing the methodology above, an exponential wave may be produced by locally heating a material, such as a rod or a conducting trace, with a laser beam, or other source, and moving the beam along a path, such as a rod or trace, with a constant speed. In such an embodiment, the resulting temperature profile along the path (which may be a rod or trace) is an exponential waveform, T(x,t), of the form shown above, propagating at the speed of the localized moving heat source.

Similar demonstrations of the currently disclosed methodology may be shown in other media by considering the steady state solution to differential equations, including sets of coupled equations, describing wave propagation of an exponential waveform in those media. For other media, an input waveform having an exponential coefficient may be assumed, and the appropriate propagation equation(s) may be solved accordingly to determine the relationship between the exponential coefficient, the propagation velocity, the wave attenuation, and one or more transmission line parameters. Solution of such propagation equations using a known input waveform may be accomplished using a variety of mathematical methods known in the art.

Transmitting energy signals in accordance with the present disclosure also enables controlling the depth of penetration of propagating waves in three dimensional media by controlling α. For the case of transmitting signals on electromagnetic transmission lines, the methods and systems of the present disclosure enable control of the skin depth of conduction currents in the conducting structure of a transmission line. Similar control of depth of penetration of propagating energy signals in three dimensional media may be achieved with benefit of the present disclosure where the energy signals are other than electromagnetic, such as but not limited to, thermal, diffusion, or acoustic.

For applications where the signal is non-electromagnetic, one may use a transducer to convert an electrical signal to one suitable for a particular application, as is known in the art. Such a transducer may be included in a feedback loop with a power amplifier used to drive the transducer, as is known in the art. In other applications, a transducer may impedance-match an electromagnetic transmission line or convert a voltage signal to an acoustic signal. Transducers for various transmission media are available commercially, and examples include speakers, piezoelectric devices, antennas, thermal heaters, and any other transducer known in the art.

Figure 1B:
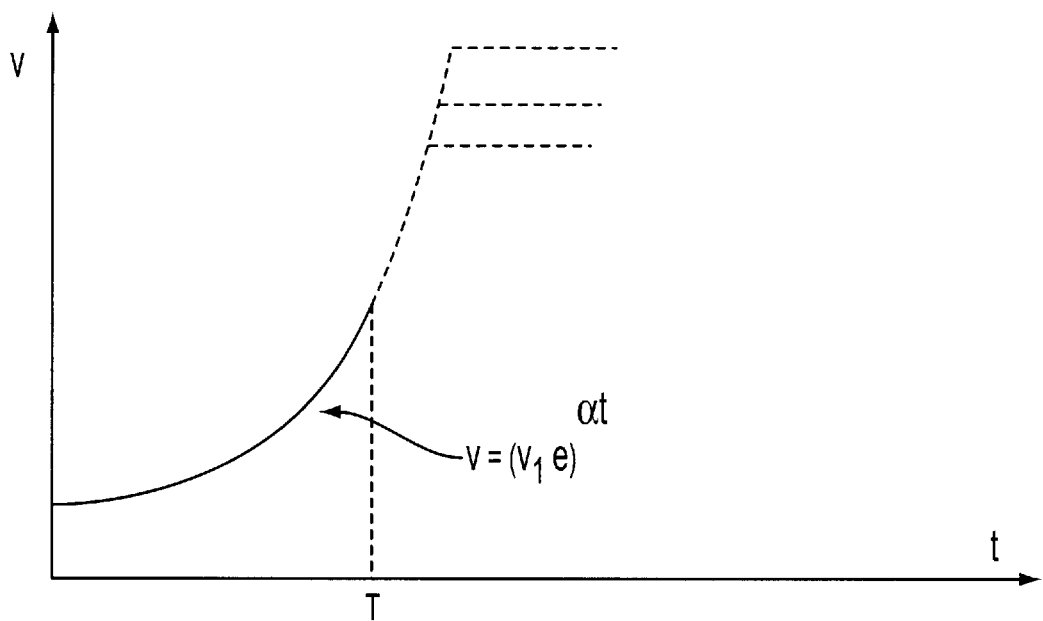

FIG. 1A and FIG. 1B show examples of exponential waveforms that may be used in accordance with the presently described methods and systems. The waveform in FIG. 1A is a positive exponential waveform with a zero initial condition and with various maximum amplitudes shown with dotted lines. The waveform in FIG. 1B is a positive exponential waveform with an initial value of D and various maximum amplitudes shown with dotted lines.

As will be apparent to one having skill in the art, the input signals used in the present invention need not be equal to $De^{\alpha t}$, and in a more general case, a suitable input signal waveform may be represented by a function such as, but not limited to:

$V_{in} = De^{\alpha t} + A + f(t)$ where $f(t)$ does not include the form $e^{\alpha t}$ The additive function f(t) does not detract from the solution of various wave equations such as the equations discussed above. With time, the term containing $e^{\alpha t}$ will dominate the steady state solution, and the characteristics of the propagation wave will be as described, herein. The constant 'A' may be employed to set waveform initial conditions and may therefore prove useful in many applications.

Because positive exponential waveforms continually increase, practical considerations may create the need to truncate or limit the waveform at some level determined by the specific application. Truncation may be accomplished by several methods, as is known in the art.

To utilize a positive exponential as a forcing function on an input of transmission media requires the generation of an appropriate signal. One may use an exponential waveform suitable for generating constant propagation velocity as described herein, and that exponential waveform may be generated in several manners known in: the art of electronics. For example, one may use waveforms with a single step with a positive exponential function over a time interval T, or one may use repetitive waveforms with repeating rising, falling, or rising and falling edges defined by a positive exponential function. Positive exponential waveforms may prove difficult in practice since they theoretically increase without limit. In practical applications, the exponential may be applied over some time interval and after that interval the signal may be truncated or returned to an initial level, as is known in the art. Terminating or truncating the waveform is purely arbitrary and is only a requirement of particular applications and is not required by the present invention.

Figure 2:
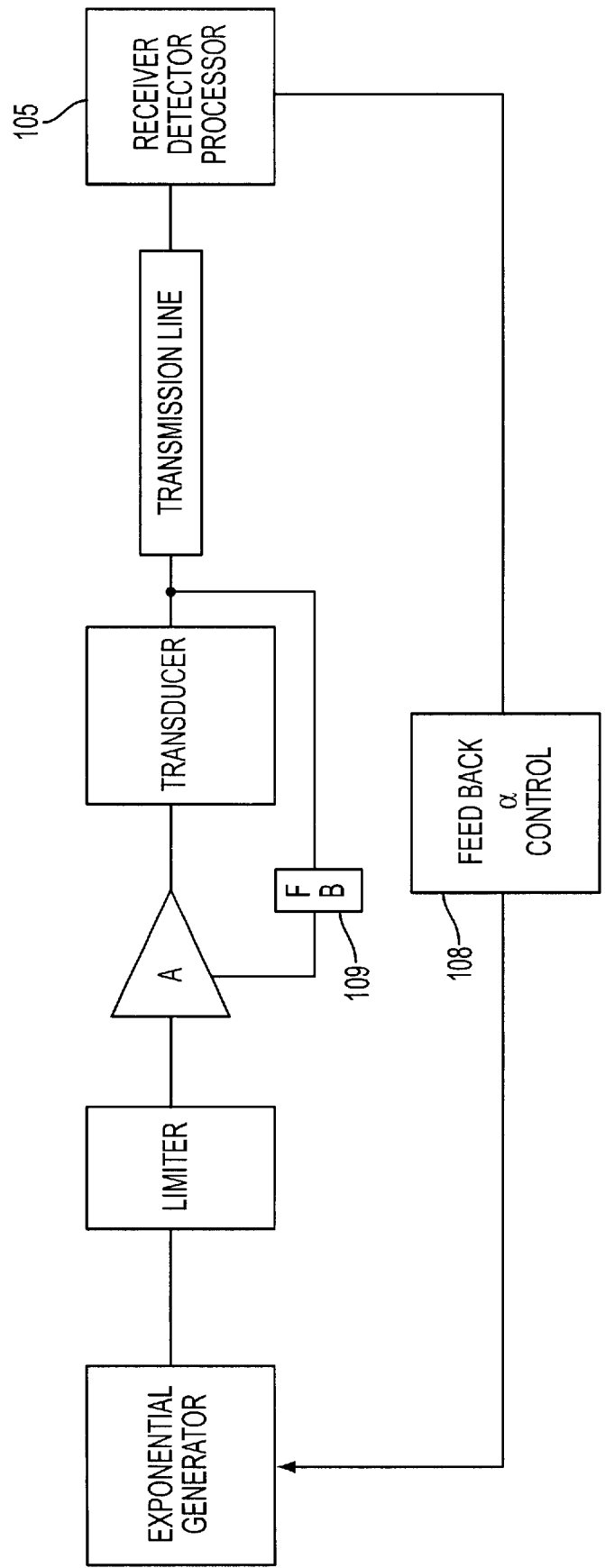
FIG. 2 is a general block diagram of an apparatus for producing positive exponential waveforms according to the present disclosure.

FIG. 2 shows, in block diagram form, a system that may be used to generate suitable waveforms. Two feed-back loops are shown for the block diagram in FIG. 2. Feedback loop 109 may be used when a transducer output is forced to follow in input voltage. Feedback loop 108 may be used when a measured parameter is fed back to control exponential coefficient α. Device 105 depicts a composite of functions to receive, detect, process and send back to a generator information to modify the exponential generator's output.

One of skill in the art will recognize that there may be several methods to produce an exponential waveform-generating circuit. Circuits for producing negative exponential waveforms are common. However, those that produce positive exponential signals are rare. Three general waveform circuits may be particularly useful for carrying forth embodiments described herein and are outlined below.

Circuit Methodology 1

Methodology 1 utilizes waveforms that result from the solution to the differential equation:

$v(t) = k(d\ v(t)/dt)$

Figure 3A:
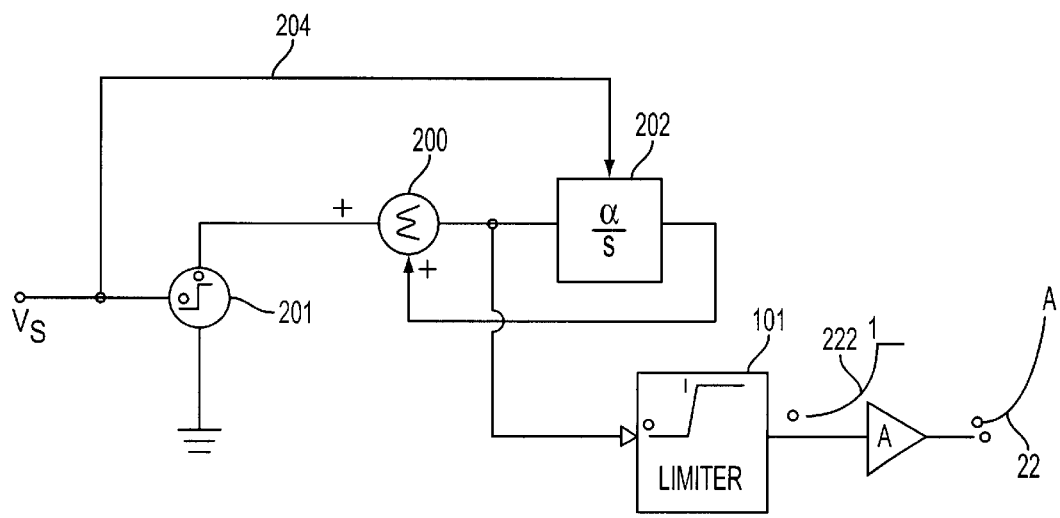
FIG. 3A is a schematic of a circuit for producing a positive exponential waveform according to the present disclosure.
Figure 3B:
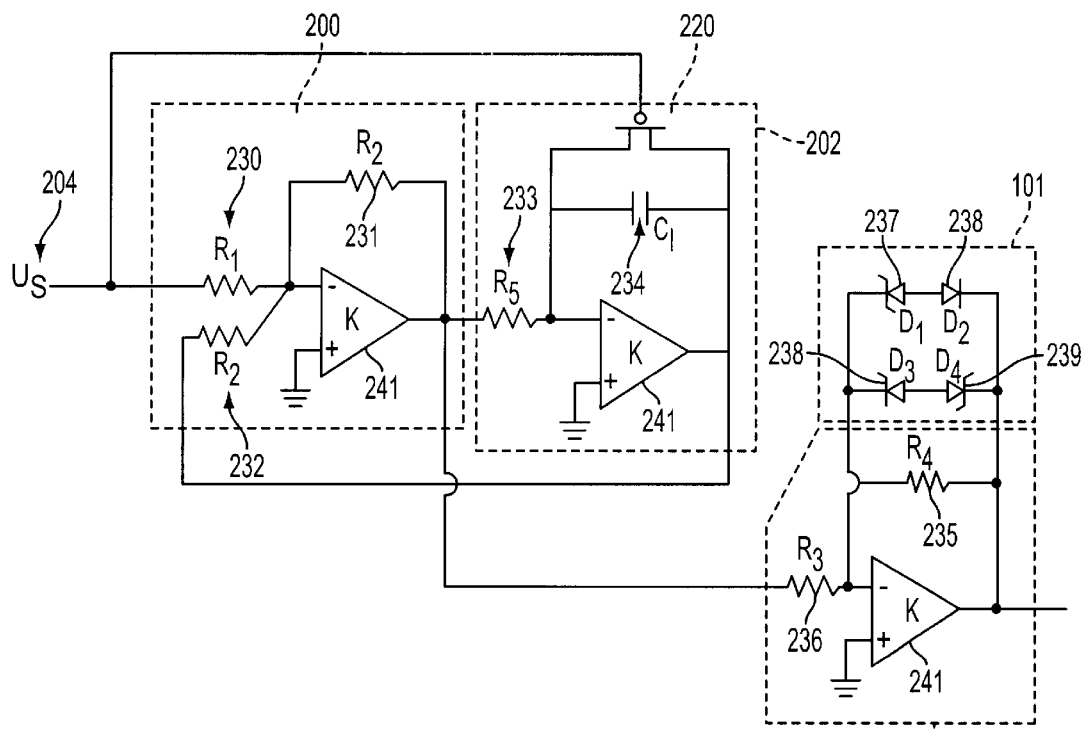
FIG. 3B is a schematic of a circuit for producing a positive exponential waveform according to the present disclosure.

FIGS. 3A and 3B show block diagrams of Circuit Methodology 1 as well as an operational amplifier circuit solution. Operational amplifiers 241 may be used in at least three different configurations to create a inverting summing amplifier 200, inverting integrator 202 and amplifier 104. Resistors 231 and 230 may set the gain of the step input 204 that starts a positive exponential of the general form $De^{\alpha t}$. Capacitor 234 may be held reset by FET 220 until input 204 starts a cycle. The output of summing amplifier 200 may be fed to amplifier 104 that inverts and amplifies the signal to produce a positive exponential waveform. Diodes 237, 238, and 239 may form a bi-directional limiting network on the feedback of amplifier 104. Diodes 237 and 239 are zener diodes whose zener voltages may be varied to change limit ranges. The voltage on the positive input of amplifier 104 may be varied to change the lower limit. The circuit in FIG. 3B is one embodiment of a circuit that may be used to solve the differential equation whose solution is a positive exponential in time.

Circuit Methodology 2

Methodology 2 uses a diode that has a current that is a positive exponential of a voltage $V_d$ and making $V_d$ a linear function of time and using the resulting current to generate a voltage that is a positive exponential in time.

Figure 4:
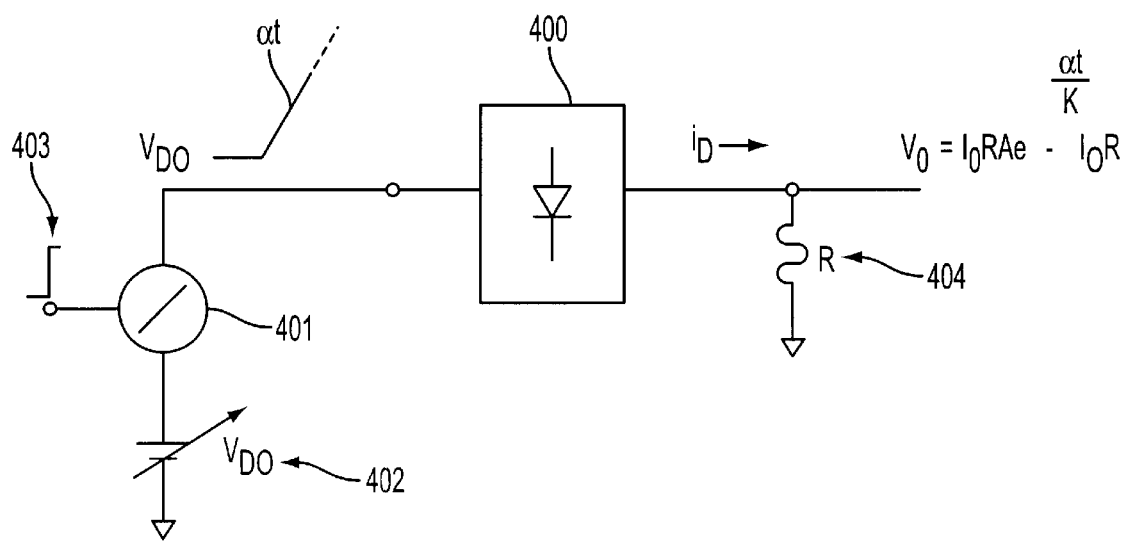
FIG. 4 is a schematic of a circuit for producing a positive exponential waveform according to the present disclosure.
Figure 5:
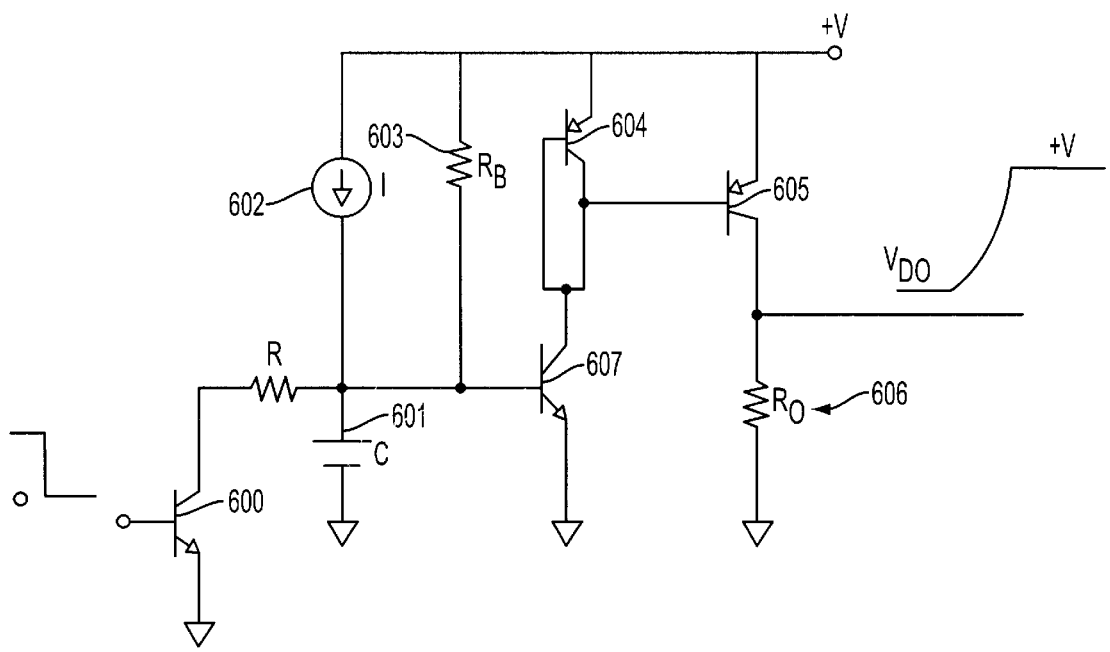
FIG. 5 is a schematic of a circuit for producing a positive exponential waveform according to the present disclosure.

FIG. 4 shows a schematic circuit diagram of Circuit Methodology 2. A triggered ramp generator 401 with offset voltage 402 biases diode 400 on the threshold of turn on. The gate signal 403 starts the linear ramp which generates a diode current that is a positive exponential in time and which produces a like-voltage when it flows in resistor 404. FIG. 5 shows an embodiment where the diode current as a function of voltage may be used to implement a positive exponential voltage in time.

Current source 602 will charge capacitor 601 if transistor 600 is off. Resistor 603 may bias the transistor 607 near turn-on. The current in transistor 607 may be mirrored by transistors 604 and 605 and, in turn, flows through resistor 606 to form an output voltage. The connection of transistors 604 and 605 is a configuration commonly referred as a current mirror. When transistor 600 is turned off, capacitor 601 charges linearly since the base current is small. The voltage across the base emitter junction of 607 will be a linear ramp voltage and the collector current in 607 will be a positive exponential in time. Transistors 604 and 605 mirror this current to produce the positive exponential voltage on resistor 606. Varying the limit value of the waveform may be achieved by increasing or decreasing the power supply voltages.

Circuit Methodology 3

Methodology 3 generates a sequence of digital numbers that represent the positive exponential function 802. This sequence may then be converted to analog via a digital to analog converter.

Figure 6:
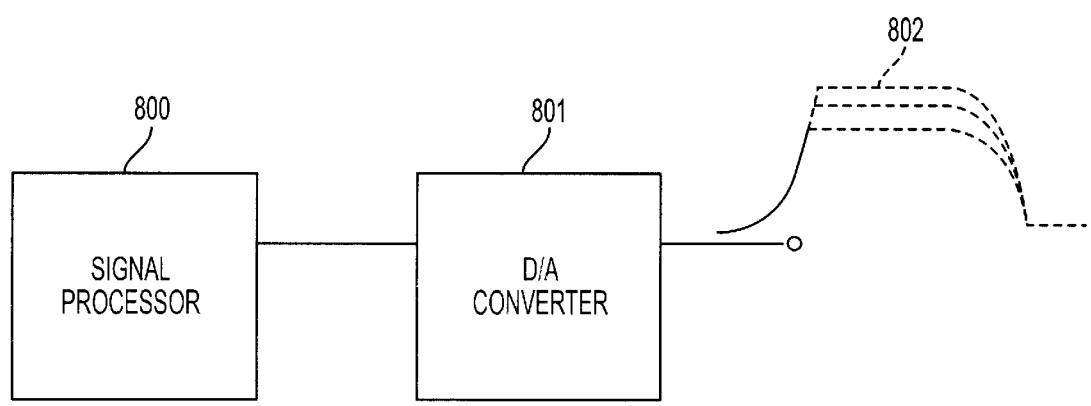
FIG. 6 is a block diagram of an apparatus for producing an exponential waveform according to the present disclosure.

FIG. 6 shows a schematic of positive signal generation using a processor 800 and a D/A converter 801. This general method may be used to produce an arbitrary voltage, $V=De^{\alpha t}+A+f(t)$, using an appropriate program to generate the necessary digital number sequence. A processor for the generation of the number sequence may be one of many stored program devices with memory including computer, microcomputer, microprocessor, controller or microcontroller. Although Circuit Methodology 3 may be amendable to the generation of arbitrary waveforms, the generated signals may be limited bandwidth by the clock frequency of the stored program device.

Figure 7A:
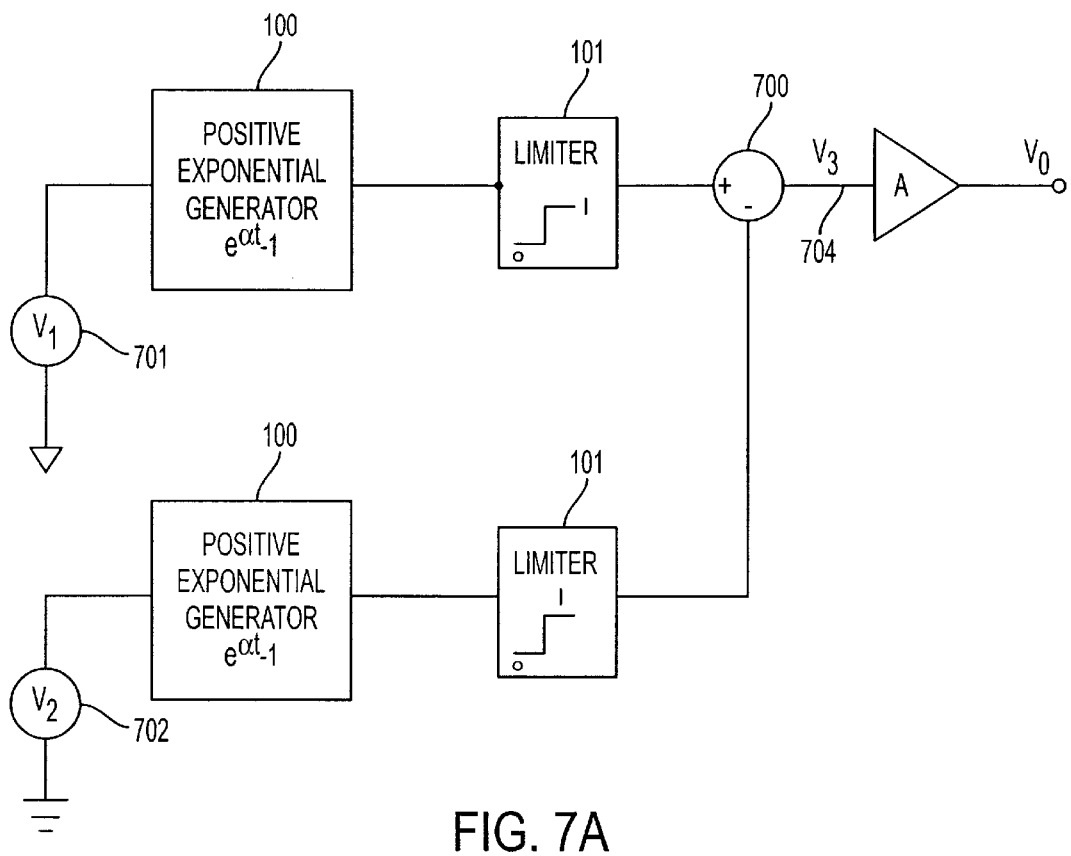
FIG. 7A is a block diagram of a circuit for producing waveforms where both the rising and falling edges of a waveform are positive exponential functions according to the present disclosure.
Figure 7B:
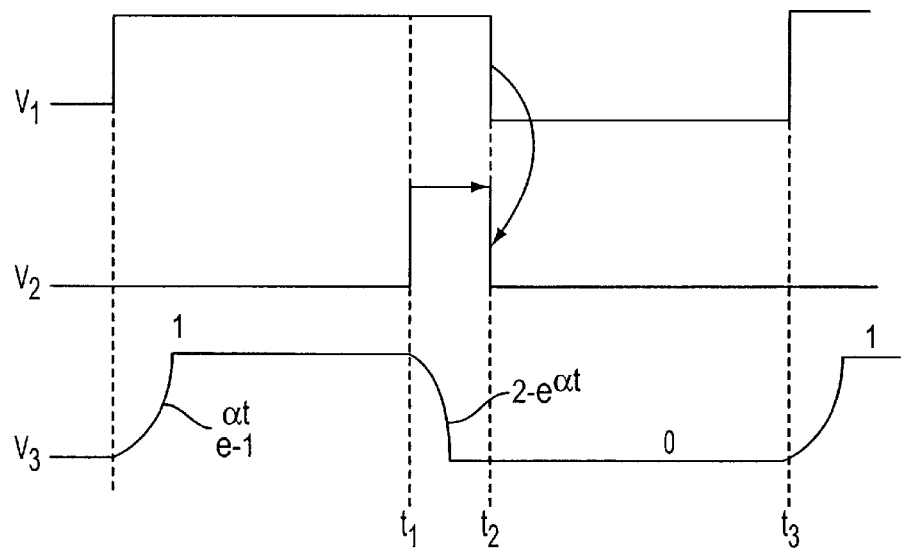
FIG. 7B is a graph of illustrative waveforms with positive exponential rising and falling edges.

One embodiment used to create a positive exponential falling edge requires a voltage subtraction process. FIGS. 7A and 7B show a block diagram of a two edge positive exponential. Voltage 701 turns on a voltage exponential generator 100 with output $e^{\alpha t}-1$, which is limited 101 and applied to summing circuit 700 to produce a voltage 704. This voltage is amplified by 104 to produce output 705. At some time $t_1$ voltage 702 turns on another voltage exponential generator 100 with output voltage defined by $e^{\alpha t}-1$ which is limited and subtracts from the voltage on the positive input of summing circuit 700. During the falling edge the output of the summing circuit is a voltage 704 defined by $2-e^{\alpha t}$. At $t_2$ the subtraction may be stopped and at a time $t_3$ the process may be repeated.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute specific modes for its practice. However, those of skill in the art should, in light of the present disclosure, appreciate that many changes can be made in the specific embodiments which are disclosed and still obtain a like or similar result without departing from the spirit and scope of the invention.

EXAMPLE 1

Figure 8:
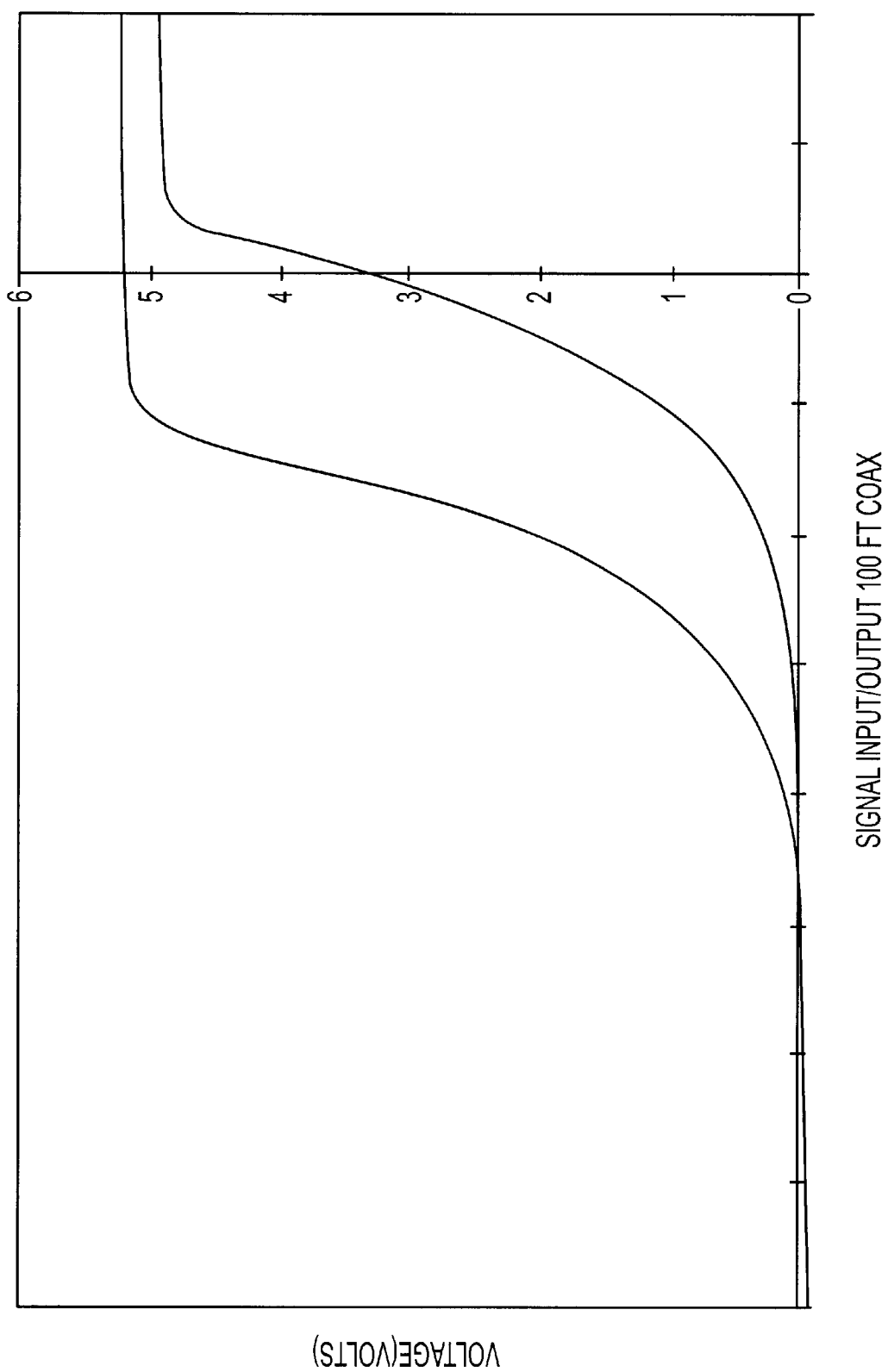
FIG. 8 is a graph showing the input (left curve) and output (right curve) of a long coax transmission line driven by the limited positive exponential waveform according to the present disclosure.
Figure 9:
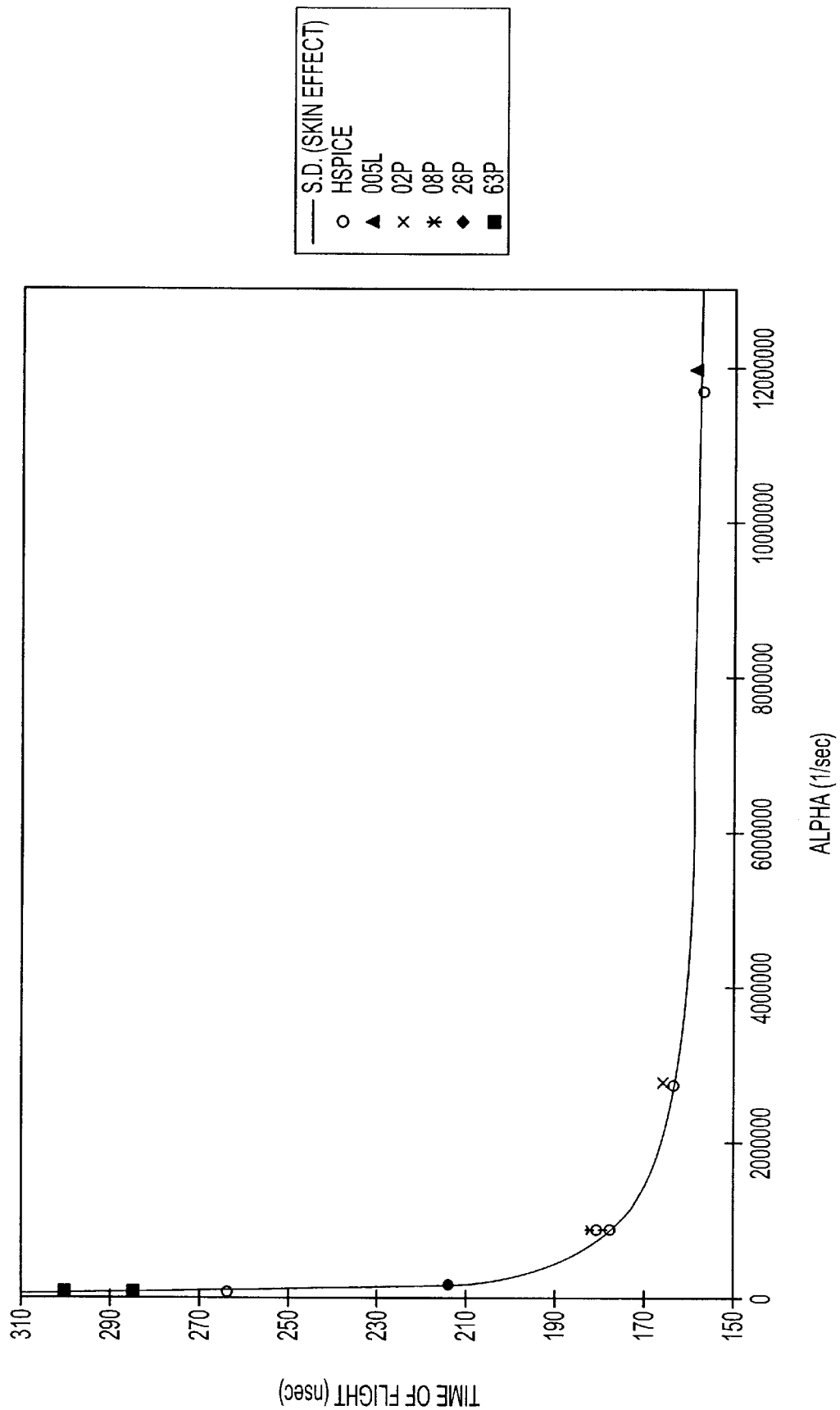
FIG. 9 is a graph showing the time of flight ($t_{of}$) vs. exponential coefficient alpha ($\alpha$) for a long coax transmission line according to the present disclosure. In this FIG., reference to HSPICE in the legend refers to a commercial circuit simulation software. package available from Avant! Corp. (46871 Bayside Parkway, Fremont, Calif. 94538) and having a website at www.avanticorp.com.

The circuit methods described herein may generate an energy wave as a voltage and, with a proper transducer, may be applicable to various wave propagation media. The experimental verification of the disclosed method was done using an exponential of the form $De^{\alpha t}$. The signal was generated for use on a long coaxial transmission line using the Method 3 above. The generated positive exponential signal was applied to a 100 foot long coaxial transmission line to verify the disclosed method. FIG. 8 and FIG. 9 show some of the results of the verification tests. FIG. 10 is a table of the experimental results.

EXAMPLE 2

SD Modulation

Information may be transmitted in a lossy medium (e.g. using electrical transmission lines, acoustic waves, or electromagnetic waves) by using a SD waveform as disclosed herein and by modulating a by a code pattern to convey a message. A receiver may measure the changes in propagation speed or attenuation coefficient of the waveform to decode the message. The receiver's propagation velocity measurement task may be implemented by monitoring successive waveform threshold measurement timing intervals at two locations separated by a known distance. The threshold timing measurements may yield wave propagation speed information allowing estimates of a from the analytical relation of wave propagation speed and $\alpha$.

An alternative detection method may measure the attenuation coefficient of a SD wave by obtaining amplitude or pulse area measurements of the propagating wave at two or more locations separated by known distances. Another implementation of this type of modulation may involve transmission of a SD wave long distances through a low loss medium, which may then be detected by a receiver containing a short path of highly lossy transmitting material. The propagation speed through the receiver's short lossy path may then be monitored using threshold timing measurements along the path to decode the transmitted message. Alternatively, the SD wave attenuation may be measured inside the receiver's lossy transmission path yielding the modulated pattern of α. If both the SD wave propagation velocity and the attenuation exponent are measured by the detector, then the product of these two quantities may directly yield the value of that exponential coefficient α.

EXAMPLE 3

Circuit Testing

Current high-speed digital transmission circuit designs for both chip and system level packaging interconnects require consideration of maximum frequencies of 300 MHz up to one GHz. Hence, circuit designs are transmission lines, and development of this technology requires design verification by experimental high-speed circuit test and measurement systems. Current test and measurement system development is not keeping up with the rapid changes in the interconnect technology. There is great concern in the industry that this lag in circuit test technology may retard the growth in interconnect technology. Many feel that a major increase in research and development efforts into entirely new test methodologies is required to rectify the situation.

A new circuit testing methodology is provided by the present disclosure. This test technology is based on utilizing variable speed pulses that are detected and timed by simple threshold detectors connected at one or more locations in the circuit. The speed variation of the propagating pulses may be controlled by a measurable shape parameter in the applied circuit input pulse waveform. This input shape parameter and the resulting propagating pulse velocity obtained from the threshold detectors are the only measurements required to evaluate a simple equation yielding characteristic parameters of the transmission line.

Figure 11:
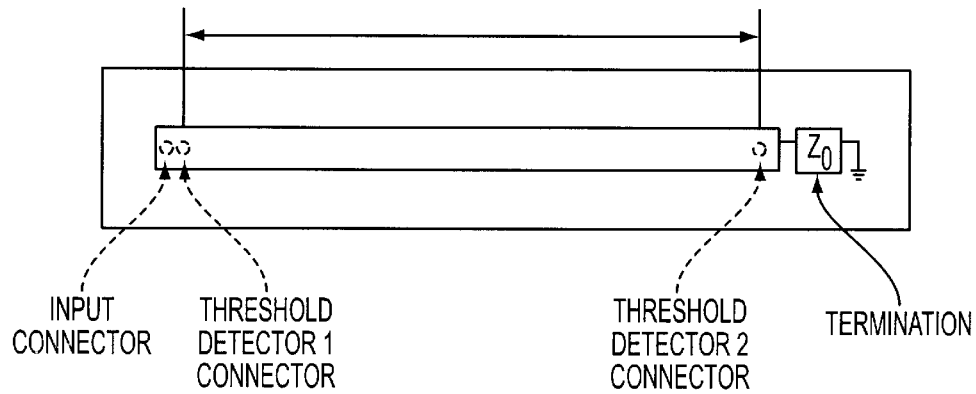
FIG. 11 is a schematic of a transmission line and a test connection according to the present disclosure.
Figure 12:
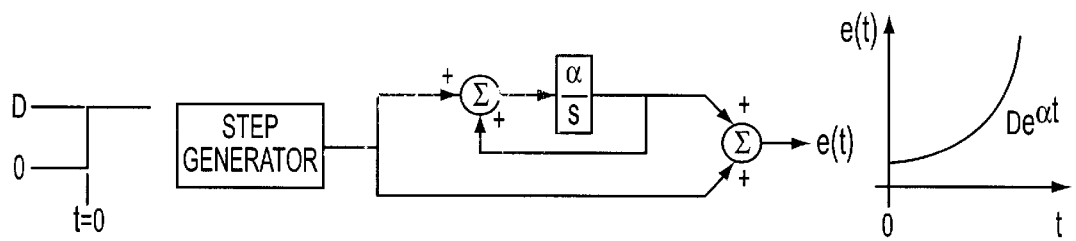
FIG. 12 shows a diagram of an input pulse waveform generator according to the present disclosure.

One detector is adequate for measuring the pulse time of flight if the threshold times of an incident and reflected return pulse are measured at a single location in the line. In this case, if the line and pulse shape parameters are known, the computed pulse speed and attenuation along with the measured pulse round trip time of flight determine the location and the numerical evaluation of the line fault or impedance discontinuity causing the pulse reflection. A conceptual sketch of a transmission line showing two test connections is illustrated in FIG. 11. An input pulse waveform and two threshold detectors are shown. The threshold detectors of FIG. 11 determine the time that a traveling pulse reaches a threshold level at the detector's monitoring positions along the line. The input pulse waveform requires an exponential shape tailored for this test method. A waveform generator producing this type pulse (α>0) is shown in FIG. 12. It includes a step generator followed by an exponential waveform producing circuit.

Figure 13:
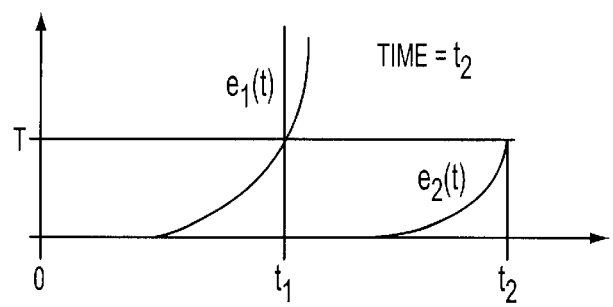
FIG. 13 shows a threshold detector input according to the present disclosure.

The input applied to the transmission line of FIG. 11 by the waveform generator of FIG. 12 may produce threshold level detector inputs $e_1(t)$ and $e_2(t)$ shown in FIG. 13. In FIG. 13, T is the signal threshold setting of the threshold detectors, and $t_1$ and $t_2$ are the times measured by the threshold detectors that $e_1$ and $e_2$ pass the threshold level. The pulse propagation velocity v may be measured from the ratio $(t_2-t_1)/l$ where l is the separation distance between the threshold detectors along the line. The transmission line of this example is assumed to be described by the version of the Telegraph Equation containing three parameters: $\overline{R}$ (resistance per unit length), $\overline{L}$ (inductance per unit length), and $\overline{C}$ (capacitance per unit length). Then the input waveform exponent, α, and v are simply related to $\overline{R}, \overline{L},$ and $\overline{C}$ by $$\alpha = \frac{\overline{RC}v^2}{1 - \overline{LC}v^2}.$$

Thus, performing the line test twice with two different sets of (measured) values for α(α>0) and v yields two equations of this form, permitting an estimation of $\overline{RC}$ and $\overline{LC}$. In the $\overline{RC}$ case, a minimum of one test result is needed to estimate the line parameter $\overline{RC}$. A similar result may also be obtained for transmission lines described by all four parameters, $\overline{R}, \overline{C}, \overline{L},$ and $\overline{G}$, as will be apparent to those of skill in the art having the benefit of the present disclosure.

Measuring the coefficient of attenuation in the response resulting from changing a is an alternative approach for estimating line parameters since, like the propagation velocity, the coefficient of attenuation also depends on the line parameters in addition to α.

Figure 14:
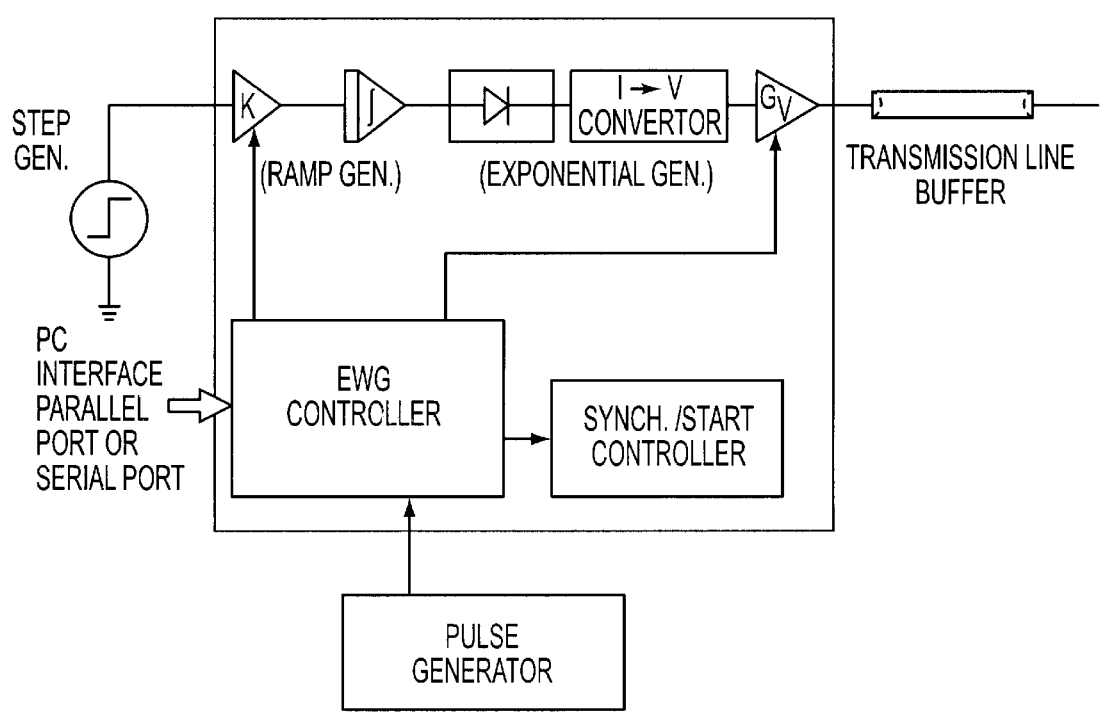
FIG. 14 shows a diagram of a exponential waveform pulse generator according to the present disclosure.
Figure 15:
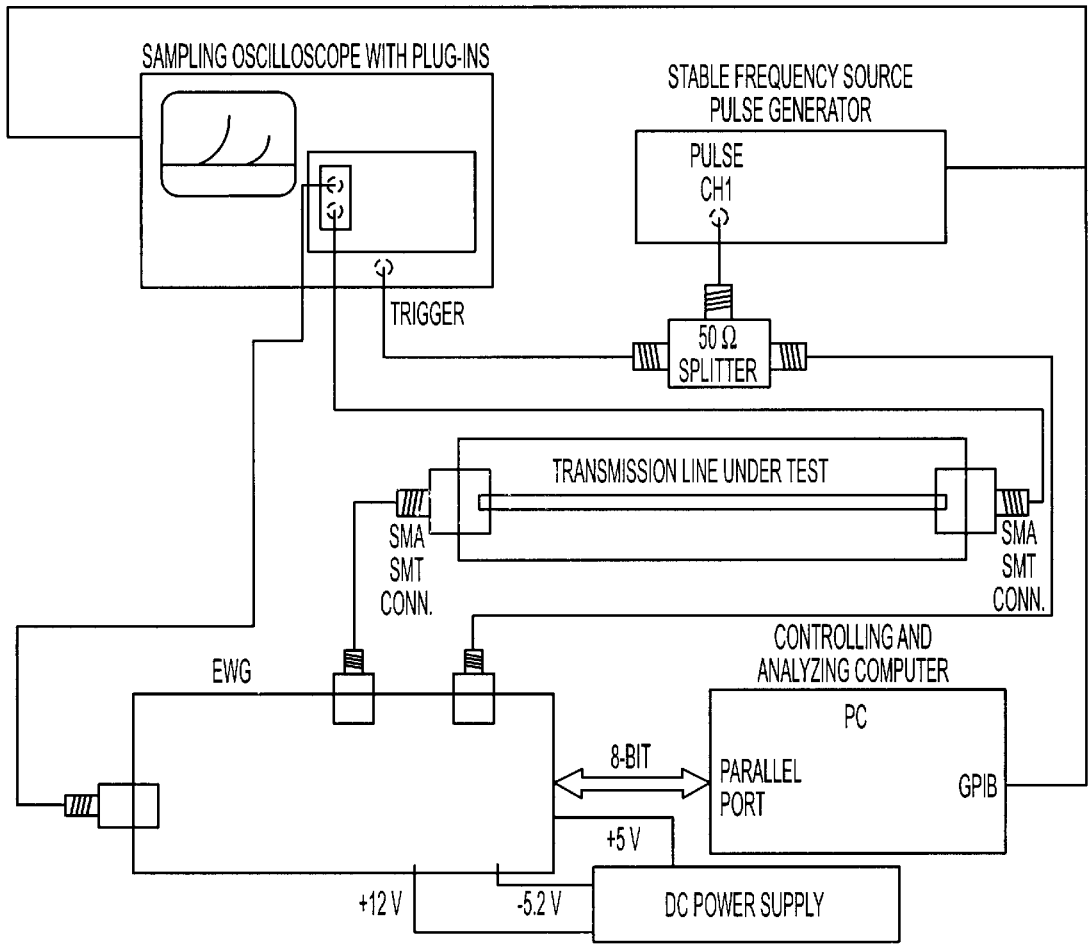
FIG. 15 shows a conceptual design of the overall measurement equipment setup to perform proof-of-principal experiments according to the present invention.

FIG. 14 shows a diagram of suitable exponential waveform pulse generator (EWG). FIG. 15 shows one configuration of an overall experimental measurement set up.

EXAMPLE 4

VLSI and Broadband Packaging Interconnect Design

Methods and systems disclosed herein may be used as an interconnect delay evaluation and optimization tool. Analysis in accordance with the present disclosure yields simple expressions for line delay that are equally valid for all lossy variations of the four parameter transmission line model of an interconnect, even including those with frequency dependent parameters important in the packaging environment. Models utilizing the techniques of this disclosure promise to be more accurate than those used in the current CAD tools as well as being more broadly applicable to both on-chip interconnects and the packaging environment.

Minimizing On-Chip Interconnect Delay

The delay of interconnects on high performance chips with lengths from about 1 mm up to the dimension of the die are often estimated from lossy transmission line theory using either a low-loss RLC line approximation or, for very resistive interconnects, an alternative approximation that is based on a distributed RC model of the transmission line that neglects inductive effects. The former low-loss delay estimate is appropriate for recently proposed long, low-resistive lines on a chip that are made with conductor geometry that is much larger in cross section ("obese") than the current technology sub-micron ground rules. The RC line delay approximation, which neglects inductive effects, is only appropriate for the short, highly resistive interconnects that are just long enough to begin to have significant transmission line behavior and cannot be adequately modeled with lumped models. However, there is a large gap of longer resistive interconnects with line characteristics lying between these two delay estimation approximations that can presently be analyzed only with time consuming circuit simulations.

An approach in accordance with the present disclosure is not limited to either the very resistive or low loss cases. In fact, the methodology disclosed herein is a single uniformly applicable result accurate for both extremes and all lossy cases in between.

One example to demonstrate techniques of the present disclosure involves a very resistive 15 mm interconnect using typical values for a 0.5 µm CMOS technology (This interconnect line as a capacitance per unit length (C) equal to 0.25 pF/mm, resistance per unit length (R) equal 18 ohms/mm, and inductance per unit length (L) of 0. 1 74 nH/mm, with relative dielectric constant equal 4.0). The interconnect delay is conventionally minimized assuming approximate estimates for the delay of the step response of an RC transmission line when the receiving end of the line is un-terminated.

The result for the conventional estimate of the minimized total circuit delay is 753 ps for this example. Assuming $\epsilon_R=4$, a lossless 15 mm long terminated line would have a delay of (6.6 ps/mm) (15 mm)=99 ps, or about 1/7 of the conventional total circuit delay estimate of this highly resistive on-chip line. This large performance limiting difference in the estimated versus ideal interconnect delay may be called the $L^3$ ("Long Lossy Line") effect.

One way to reduce the delay of these long lines is to lower their resistance to that of "low loss" lines (defined as having a total series resistance less than 2 Zo) by making them "obese" lines with their cross sectional area being much larger than the minimum dimension for the short lines on the device. This requires additional wiring planes on the chip to accommodate these "obese" lines with consequential yield and cost implications.

Analyzing this interconnect using methods of the present disclosure results in a significantly smaller circuit delay of 169 ps, which is obtained using three 5mm sections and three SD drivers. The SD driver input comprising a positive exponential function can be created with an unstable positive feedback loop (such as currently found in high speed analog IC latched comparators and memory cells) and may be represented by:

$$V(t) = De^{\frac{t}{\tau_{SD}}}$$

where D=0.1 volts and $\tau_{SD}$=10 ps assuming a maximum driver slew rate (Chips with 500 MHz clock rates have driver signals with up to 20 V/ns slew rates. Scaling here to 3 GHz clock rate imply slew rates comparable with 100 V/ns). The output end of each of the 5-mm line segments is assumed to be unterminated. The SD line segment delay, assuming the example RLC line parameters and segment length $l_s$=5 mm, is $$\tau l_s = (l_s \sqrt{LC}) \sqrt{1 + \frac{\tau_{SD}}{\left(\frac{L}{R}\right)}}$$

and is equal to 47.2 ps. The SD line driver delay $t_d$ is 9.2 ps, assuming the line output switching level is 50% of the input signal maximum and that the line output voltage is doubled due to the unterminated end.

The total SD interconnect delay is 56.4 ps×3=168.9 ps, neglecting any repowering repeaters. The comparable delay for this interconnect example via traditional methods is 628 ps, which is the sum of 375 ps (circuit $\overline{RC}$ loading delay of the two drivers) plus 253 ps (RC transmission line delay estimate for step voltage inputs to the two 7.5 mm unterminated line segments).

The SD results are less than 1/3 the conventional minimized delay estimate for this $L^3$ interconnect. However, this improved result is still 2.5 times larger than the no loss (ideal) delay for the interconnect. Nevertheless, the reduction in line delay is significant and if increases in conductor cross-sectional area were necessary to decrease the delay further, then this increase in line geometry would be less pronounced. Alternatively, the SD line delay could be reduced more (approaching the no-loss line delay) by a further reduction in the SD driver time constant, $\tau_{SD}$. How close this limit is reached may then ultimately determined by how small the SD driver time constant may be made, and the interconnect performance limiting factor is the SD driver design performance.

The SD interconnect delay is significantly less than the conventional step response interconnect delay estimate for two major reasons. First, the SD line driver delay is considerably less than the delay of the conventional RC line driver and secondly, the simple SD delay analysis includes the actual inductive effects of the line, whereas the less accurate conventional RC step response analysis does not. The less complex SD analysis permits the inclusion of the delay reducing inductive line effects, but the more complex conventional analytical analysis of the step response of this Long Lossy Line is intractable when inductive as well as RC effects are included.

In sum, the current SD approach to lossy transmission line interconnect analysis promises significant improvements in VSLI design performance, compared with that obtainable with designs based on conventional delay estimation methods. The SD analysis of interconnects is more general in scope, yet much less complex, than analyses derived from standard lossy transmission line theory.

While the present disclosure may be adaptable to various modifications and alternative forms, specific preferred embodiments have been shown by way of example and described herein. However, it should be understood that the present disclosure is not intended to be limited to the particular forms disclosed. Rather, it is to cover all modifications, equivalents, and alternatives falling within the spirit and scope of the disclosure as defined by the appended claims. For instance, the disclosed methods and systems may be applied to various transmission media, as mentioned above. Moreover, different aspects of the disclosed methods and systems may be utilized in various combinations and/or independently. Thus the invention is not limited to only combinations shown herein, but rather may include other combinations. In other words, those of skill in the art should, in light of the present disclosure, appreciate that many changes can be made in the embodiments that are disclosed and still obtain a like or similar result without departing from the spirit and scope of the invention.

REFERENCES

The following references, to the extent that they provide exemplary procedural or other details supplementary to those set forth herein, are specifically incorporated herein by reference.

1. Carslaw and Jaeger, "Conduction of heat in solids", Oxford University Press, 1959.
2. Crank, "The mathematics of diffusion", Oxford University Press, 1975.
3. Jordan and Balmain, "Electromagnetic waves and radiating systems", Prentice -Hall, 1968
4. L. E. Kinsler and A. R. Frey, "Fundamentals of acoustics", John Wiley &. Sons, Inc, 1962.
5. Moore, "Traveling-wave engineering", McGraw-Hill Book Company, Inc. 1960.
6. Morse, D. M. and H. Feshback, "Methods of Theoretical Physics, Part I", McGraw-Hill Book Company, Inc. 1953.

What is claimed is:

1. A method for transmitting a waveform having an essentially constant propagation velocity along a transmission line, comprising:
   generating an exponential waveform, the exponential waveform (a) being characterized by the equation $V_{in} = De^{\alpha t} + A + f(t)$, where $V_{in}$ is a voltage, t is time, D and A are constants, $\alpha$ is an exponential coefficient, and f(t) is a function of time and (b) being truncated at a maximum value; and
   applying the waveform to the transmission line to transmit the waveform at an essentially constant propagation velocity, the propagation velocity being related to $\alpha$ and a transmission parameter of the transmission line.

2. The method of claim 1, wherein the transmission parameter comprises inductance, resistance, capacitance, conductance, or any combination thereof of the transmission line.

3. The method of claim 1, wherein the propagation velocity is related to $\alpha$ in accordance with the equation:

$$v = \sqrt{\frac{\alpha}{\overline{RC}}},$$

where v represents the propagation velocity, $\overline{R}$ represents resistance per unit length and $\overline{C}$ represents capacitance per unit length of the transmission line.

4. The method of claim 1, wherein an attenuation coefficient of the waveform comprises $$\left(\sqrt{\overline{RC}\alpha}\right),$$

where $\overline{R}$ represents resistance per unit length and $\overline{C}$ represents capacitance per unit length of the transmission line.

5. The method of claim 1, wherein the propagation velocity is related to $\alpha$ in accordance with the equation:

$$v = \sqrt{\alpha k}$$

where v represents the propagation velocity and k represents diffusivity.

6. The method of claim 1, wherein an attenuation coefficient of the waveform comprises $\sqrt{\alpha/k}$, where k represents diffusivity.

7. The method of claim 1, wherein the propagation velocity is related to $\alpha$ in accordance with the equation:

$$v = \sqrt{\frac{\alpha}{(\overline{RC} + \overline{LC}\alpha)}},$$

where v represents the propagation velocity, $\overline{R}$ represents resistance per unit length, $\overline{L}$ represents inductance per unit length, and $\overline{C}$ represents capacitance per unit length of the transmission line.

8. The method of claim 1, wherein an attenuation coefficient of the waveform comprises $$\sqrt{\overline{LC}\alpha^2 + \overline{RC}\alpha},$$

where $\overline{R}$ represents resistance per unit length, $\overline{L}$ represents inductance per unit length, and $\overline{C}$ represents capacitance per unit length of the transmission line.

9. The method of claim 1, wherein the propagation velocity is related to $\alpha$ in accordance with the equation:

$$v = \frac{1}{\sqrt{(\overline{LC}) + (\overline{LG})\left(\frac{1}{\alpha}\right)}}$$

where v represents the propagation velocity, $\overline{C}$ represents capacitance per unit length, $\overline{L}$ represents inductance per unit length, and $\overline{G}$ represents conductance per unit length of the transmission line.

10. The method of claim 1, wherein an attenuation coefficient of the waveform comprises coefficient $$\sqrt{\overline{LC}\alpha^2 + \overline{LG}\alpha},$$

where $\overline{C}$ represents capacitance per unit length, $\overline{L}$ represents inductance per unit length, and $\overline{G}$ represents conductance per unit length of the transmission line.

11. The method of claim 1, wherein the propagation velocity is related to $\alpha$ in accordance with the equation:

$$v = \frac{1}{\sqrt{(\mu\varepsilon) + (\mu\sigma)\left(\frac{1}{\alpha}\right)}}$$

where v represents the propagation velocity, $\mu$ represents electrical permeability, $\epsilon$ represents electrical permittivity, and $\sigma$ represents electrical conductivity.

12. The method of claim 1, wherein an attenuation coefficient of the waveform comprises $\sqrt{(\mu\epsilon)\alpha^2 + (\mu\sigma)\alpha}$, where $\mu$ represents electrical permeability, $\epsilon$ represents electrical permittivity, and $\sigma$ represents electrical conductivity.

13. The method of claim 1, wherein the propagation velocity is related to $\alpha$ in accordance with the equation:

$$v = \frac{\alpha}{\sqrt{\overline{LC}\alpha^2 + (\overline{LG} + \overline{RC})\alpha + \overline{RG}}},$$

where v represents the propagation velocity, $\overline{R}$ represents resistance per unit length, $\overline{C}$ represents capacitance per unit length, $\overline{L}$ represents inductance per unit length, and $\overline{G}$ represents conductance per unit length of the transmission line.

14. The method of claim 1, wherein an attenuation coefficient of the waveform comprises $$\sqrt{\overline{LC}\alpha^2 + (\overline{LG} + \overline{RC})\alpha + \overline{RG}},$$

where $\overline{R}$ represents resistance per unit length, $\overline{C}$ represents capacitance per unit length, $\overline{L}$ represents inductance per unit length, and $\overline{G}$ represents conductance per unit length of the transmission line.

15. The method of claim 1, wherein the propagation velocity is related to $\alpha$ in accordance with the equation:

$$v = \frac{1}{\sqrt{(\overline{L}(\alpha)\overline{C}(\alpha)) + (\overline{L}(\alpha)\overline{G}(\alpha) + \overline{R}(\alpha)\overline{C}(\alpha))\left(\frac{1}{\alpha}\right) + \overline{R}(\alpha)\overline{G}(\alpha)\left(\frac{1}{\alpha}\right)^2}}$$

where v represents the propagation velocity, $\overline{R}(s)$ represents frequency-dependent resistance per unit length, $\overline{C}(s)$ represents frequency-dependent capacitance per unit length, $\overline{L}(s)$ represents frequency-dependent inductance per unit length, and $\overline{G}(s)$ represents frequency-dependent conductance per unit length of the transmission line.

16. The method of claim 1, wherein an attenuation coefficient of the waveform comprises $$\sqrt{(\overline{L}(\alpha)\overline{C}(\alpha))\alpha^2 + (\overline{L}(\alpha)\overline{G}(\alpha) + \overline{R}(\alpha)\overline{C}(\alpha))\alpha + \overline{R}(\alpha)\overline{G}(\alpha)},$$

where $\overline{R}(s)$ represents frequency-dependent resistance per unit length, $\overline{C}(s)$ represents frequency-dependent capacitance per unit length, $\overline{L}(s)$ represents frequency-dependent inductance per unit length, and $\overline{G}(s)$ represents frequency-dependent conductance per unit length of the transmission line.

17. The method of claim 1, wherein the propagation velocity is related to $\alpha$ in accordance with the equation:

$$v = \sqrt{c^2 + \left(\frac{R}{\rho_0}\right)\alpha}$$

where v represents the propagation velocity, c represents velocity of propagation without viscosity, R represents effective viscosity, and $\rho_0$ represents equilibrium density.

18. The method of claim 1, wherein an attenuation coefficient of the waveform comprises $$\frac{\alpha}{\sqrt{c^2 + \left(\frac{R}{\rho_0}\right)\alpha}},$$

where c represents velocity of propagation without viscosity, R represents effective viscosity, and $\rho_0$ represents equilibrium density.

19. The method of claim 1, wherein the propagation velocity is related to $\alpha$ in accordance with the equation:

$$v = \sqrt{\frac{\tau c_\infty^2 \alpha + c_0^2}{\tau \alpha + 1}}$$

where v represents the propagation velocity, $c_\infty$ and $c_0$ represent speeds of sound at infinite frequency and zero frequency, respectively and where $\tau$ represents a relaxation time.

20. The method of claim 1, wherein an attenuation coefficient of the waveform comprises $$\alpha \sqrt{\frac{\tau \alpha + 1}{\tau c_\infty^2 \alpha + c_0^2}},$$

where $c_\infty$ and $c_0$ represent speeds of sound at infinite frequency and zero frequency, respectively and where $\tau$ represents a relaxation time.

21. The method of claim 1, wherein the propagation velocity is related to $\alpha$ in accordance with the equation:

$$v = \frac{\alpha}{\sqrt{\frac{\alpha}{\kappa} + \frac{G(\alpha)}{KA}}}$$

where v represents the propagation velocity, $\kappa$ represents thermal diffusivity, K represents thermal conductivity, A represents cross sectional area, and G(s) represents a Laplace transform of an approximate Green's function of thermal conduction.

22. The method of claim 1, wherein an attenuation coefficient of the waveform comprises $$\sqrt{\frac{\alpha}{\kappa} + \frac{G(\alpha)}{KA}},$$

where $\kappa$ represents thermal diffusivity, K represents thermal conductivity, A represents cross sectional area, and G(s) represents a Laplace transform of an approximate Green's function of thermal conduction.

23. The method of claim 1, wherein the transmission line comprises an electrical conductor.

24. The method of claim 1, wherein the transmission line comprises a conducting trace.

25. The method of claim 1, wherein the transmission line comprises a delay line.

26. The method of claim 1, wherein the transmission line comprises an interconnect.

27. The method of claim 1, wherein the transmission line comprises an acoustic medium.

28. The method of claim 1, wherein the transmission line comprises a diffusion medium.

29. The method of claim 1, further comprising varying $\alpha$ in response to an input signal to the waveform generator.

30. The method of claim 1, further comprising:
determining the propagation velocity; and
calculating the transmission parameter using the propagation velocity and the exponential coefficient.

31. The method of claim 30, wherein the determining comprises receiving propagation information from the transmission line using one or more receiving elements coupled to the transmission line.

32. The method of claim 31, wherein the one or more receiving elements comprise a threshold detector.

33. The method of claim 1, further comprising determining an impedance discontinuity of the transmission line and its location using the exponential coefficient, the propagation velocity, and the transmission parameter.

34. The method of claim 1, further comprising modulating the exponential coefficient $\alpha$ to encode information onto the waveform.

35. The method of claim 34, further comprising monitoring modulated propagation velocity to decode the information.

36. The method of claim 34, further comprising monitoring modulated attenuation to decode the information.

37. A method for transmitting a waveform along a transmission line, comprising:
generating an exponential waveform, the exponential waveform (a) being characterized by the equation $V_{in} = De^{\alpha t} + A + f(t)$, where $V_{in}$ is a voltage, t is time, D and A are constants, $\alpha$ is an exponential coefficient, and f(t) is a function of time and (b) being truncated at a maximum value; and
applying the waveform to the transmission line to transmit the waveform such that an attenuation constant of the waveform is related to $\alpha$ and a transmission parameter of the transmission line.

38. The method of claim 37, further comprising determining an impedance discontinuity of the transmission line and its location using the exponential coefficient, the attenuation constant, and the transmission parameter.

39. A method for calculating an unknown waveform transmission characteristic from two known waveform transmission characteristics, comprising:

constructing an exponential waveform capable of being transmitted along a transmission line with an essentially constant propagation velocity, the propagation velocity being related to a transmission parameter of the transmission line and to an exponential coefficient of the waveform;

the transmission parameter defining a first unknown waveform transmission characteristic, the propagation velocity defining a second unknown waveform transmission characteristic, and the exponential coefficient defining a third unknown waveform transmission characteristic; and calculating one of the three unknown waveform transmission characteristics by setting the remaining two of the three unknown waveform transmission characteristics equal to two known waveform transmission characteristics.

40. The method of claim 39, further comprising generating the exponential waveform and transmitting the waveform along the transmission line.

41. The method of claim 39, wherein the remaining two of the three unknown waveform transmission characteristics are set equal to two known waveform transmission characteristics by measurement.

42. The method of claim 39, wherein:
one of the two known waveform transmission characteristics comprises the transmission parameter;
the other of the two known waveform transmission characteristics comprises the propagation velocity, wherein the propagation velocity corresponds to a desired delay time for the transmission line; and
the exponential coefficient is calculated to yield a computed exponential coefficient.

43. The method of claim 42, further comprising inputting an exponential waveform with the computed exponents coefficient onto the transmission line to achieve the desired delay time.

44. The method of claim 39, wherein the transmission line comprises a model transmission line.

45. The method of claim 44, wherein the transmission line comprises a model transmission line, the method further comprising fabricating an actual transmission line to corresponding to the model transmission line, the actual transmission line being configured to transmit an exponential waveform having the computed exponential coefficient to achieve the desired delay time.

46. The method of claim 45, wherein the model transmission line comprises a computer aided design model.

47. The method of claim 39, wherein:
one of the two known waveform transmission characteristics comprises the exponential coefficient;
the other of the two known waveform transmission characteristics comprises the propagation velocity, the propagation velocity being measured with an exponential waveform having the exponential coefficient; and
the transmission parameter is calculated.

48. The method of claim 47, wherein the transmission parameter comprises inductance, resistance, capacitance, conductance, or any combination thereof of the transmission line.

49. A method for calculating an unknown waveform transmission characteristic from two known waveform transmission characteristics, comprising:
constructing an exponential waveform capable of being transmitted along a transmission line with an attenuation constant related to a transmission parameter of the transmission line and to an exponential coefficient of the waveform;

the transmission parameter defining a first unknown waveform transmission characteristic, the attenuation constant defining a second unknown waveform transmission characteristic, and the exponential coefficient defining a third unknown waveform transmission characteristic; and calculating one of the three unknown waveform transmission characteristics by setting the remaining two of the three unknown waveform transmission characteristics equal to two known waveform transmission characteristics.

50. The method of claim 49, wherein:
one of the two known waveform transmission characteristics comprises the transmission parameter;
the other of the two known waveform transmission characteristics comprises the attenuation constant, wherein the attenuation constant corresponds to a desired attenuation for the transmission line; and
the exponential coefficient is calculated to yield a computed exponential coefficient.

51. The method of claim 50, further comprising inputting an exponential waveform with the computed exponential coefficient onto the transmission line to achieve the desired attenuation.

52. A method for transmitting a waveform having an essentially constant propagation velocity along a transmission line, comprising:
generating an exponential waveform, the exponential waveform being characterized by an exponential coefficient $\alpha$;
applying the waveform to the transmission line to transmit the waveform at an essentially constant propagation velocity, the propagation velocity being related to $\alpha$ and a transmission parameter of the transmission line; and
varying $\alpha$ in response to an input signal to a waveform generator.

53. A method for transmitting a waveform having an essentially constant propagation velocity along a transmission line, comprising:
generating an exponential waveform, the exponential waveform being characterized by an exponential coefficient $\alpha$;
applying the waveform to the transmission line to transmit the waveform at an essentially constant propagation velocity, the propagation velocity being related to $\alpha$ and a transmission parameter of the transmission line;
determining the propagation velocity; and
calculating the transmission parameter using the propagation velocity and the exponential coefficient.

54. The method of claim 53, wherein the determining comprises receiving propagation information from the transmission line using one or more receiving elements coupled to the transmission line.

55. The method of claim 54, wherein the one or more receiving elements comprise a threshold detector.

56. A method for transmitting a waveform having an essentially constant propagation velocity along a transmission line, comprising:
generating an exponential waveform, the exponential waveform being characterized by an exponential coefficient $\alpha$;
applying the waveform to the transmission line to transmit the waveform at an essentially constant propagation velocity, the propagation velocity being related to α and a transmission parameter of the transmission line; and determining an impedance discontinuity of the transmission line and its location using the exponential coefficient, the propagation velocity, and the transmission parameter.

57. A method for transmitting a waveform having an essentially constant propagation velocity along a transmission line, comprising:

generating an exponential waveform, the exponential waveform being characterized by an exponential coefficient α;

applying the waveform to the transmission line to transmit the waveform at an essentially constant propagation velocity, the propagation velocity being related to α and a transmission parameter of the transmission line; and modulating the exponential coefficient α to encode information onto the waveform.

58. The method of claim 57, further comprising monitoring modulated propagation velocity to decode the information.

59. The method of claim 57, further comprising monitoring modulated attenuation to decode the information.

60. A method for transmitting a waveform along a transmission line, comprising:

generating an exponential waveform, the exponential waveform being characterized by an exponential coefficient α;

applying the waveform to the transmission line to transmit the waveform such that an attenuation constant of the waveform is related to α and a transmission parameter of the transmission line; and determining an impedance discontinuity of the transmission line and its location using the exponential coefficient, the attenuation constant, and the transmission parameter.

61. A method for determining an impedance discontinuity of the transmission line and its location, comprising:

generating an exponential waveform, the exponential waveform (a) being characterized by the equation $V_{in}=De^{\alpha t}+A+f(t)$, where $V_{in}$ is a voltage, t is time, D and A are constants, α is an exponential coefficient, and f(t) is a function of time and (b) being truncated at a maximum value;

applying the waveform to the transmission line to transmit the waveform at an essentially constant propagation velocity, the propagation velocity being related to α and a transmission parameter of the transmission line; and determining an impedance discontinuity of the transmission line and its location using a time of flight of the waveform along the transmission line.

62. A method for transmitting a waveform having an essentially constant propagation velocity along three-dimensional media, comprising:

generating an exponential waveform, the exponential waveform (a) being characterized by the equation $V_{in}=De^{\alpha t}+A+f(t)$, where $V_{in}$ is a voltage, t is time, D and A are constants, α is an exponential coefficient, and f(t) is a function of time and (b) being truncated at a maximum value;

applying the waveform to the three dimensional media to transmit the waveform at an essentially constant propagation velocity, the propagation velocity being related to α and a transmission parameter of the transmission line; and changing the exponential coefficient α to control the depth of penetration of the waveform within the three dimensional media.

* * * * *

UNITED STATES PATENT AND TRADEMARK OFFICE
CERTIFICATE OF CORRECTION

PATENT NO. : 6,441,695 B1
DATED : August 27, 2002
INVENTOR(S) : Robert H. Flake

It is certified that error appears in the above-identified patent and that said Letters Patent is hereby corrected as shown below:

Column 2,
Line 27, please delete "cc" and insert -- α -- therefor.
Line 35, please delete "a" and insert -- α -- therefor.

Column 5,
Line 55, please delete "a" and insert -- α -- therefor.

Column 7,
Lines 10 and 26, please delete " $\left(or \dfrac{1}{\tau_{sd}}\right)$ " and insert -- $\alpha\left(or \dfrac{1}{\tau_{sd}}\right)$ -- therefor.

Column 8,
Line 18, please delete "a" and insert -- α -- therefor.

Column 9,
Line 8, please delete "C" and insert -- σ -- therefor.
Line 18, please delete "B" and insert -- E -- therefor.

Column 10,
Line 25, please delete "parameters" and insert -- parameters is -- therefor.
Line 62, please delete " $H_{100} = H_{100}(r,t)$ " and insert -- $H_\phi = H_\phi(r, t)$ -- therefor.

Column 11,
Line 11, please delete "a" and insert -- α -- therefor.
Line 45, please delete "$H_\theta(r,t)$" and insert -- $H_\Phi(r,t)$ -- therefor.

Column 12,
Line 9, please delete " $v = \sqrt{c^{2+(R/\rho_0)\alpha}}$ " and insert -- $v = \sqrt{c^2 + \left(\dfrac{R}{\rho_0}\right)\alpha}$ -- therefor.

UNITED STATES PATENT AND TRADEMARK OFFICE
CERTIFICATE OF CORRECTION

PATENT NO. : 6,441,695 B1
DATED : August 27, 2002
INVENTOR(S) : Robert H. Flake

It is certified that error appears in the above-identified patent and that said Letters Patent is hereby corrected as shown below:

Column 17,
Line 60, please delete "$(t_2-t_1)/1$ where 1 is" and insert -- $(t_2-t_1)/l$ where $l$ is -- therefor.

Column 22,
Lines 29 and 32, please delete "$\in$" and insert -- $\varepsilon$ -- therefor.
Line 31, please delete "$(\mu\in)$" and insert -- $(\mu\varepsilon)$ -- therefor.
Line 33, please delete "a" and insert -- $\sigma$ -- therefor.

Signed and Sealed this

Second Day of September, 2003

JAMES E. ROGAN
*Director of the United States Patent and Trademark Office*